(12) United States Patent
Port et al.

(10) Patent No.: US 11,695,812 B2
(45) Date of Patent: Jul. 4, 2023

(54) SHARING PHYSICAL WRITING SURFACES IN VIDEOCONFERENCING

(71) Applicant: DOLBY LABORATORIES LICENSING CORPORATION, San Francisco, CA (US)

(72) Inventors: Timothy Alan Port, Drummoyne (AU); Richard J. Cartwright, Killara (AU)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 160 days.

(21) Appl. No.: 17/423,061

(22) PCT Filed: Jan. 14, 2020

(86) PCT No.: PCT/US2020/013548
§ 371 (c)(1),
(2) Date: Jul. 14, 2021

(87) PCT Pub. No.: WO2020/150267
PCT Pub. Date: Jul. 23, 2020

(65) Prior Publication Data
US 2022/0124128 A1  Apr. 21, 2022

Related U.S. Application Data

(60) Provisional application No. 62/958,124, filed on Jan. 7, 2020, provisional application No. 62/792,219, filed on Jan. 14, 2019.

(51) Int. Cl.
*H04L 65/403* (2022.01)
*H04N 19/593* (2014.01)
(Continued)

(52) U.S. Cl.
CPC ............ *H04L 65/403* (2013.01); *G06V 20/44* (2022.01); *G06V 20/48* (2022.01); *G06V 20/49* (2022.01);
(Continued)

(58) Field of Classification Search
CPC .......... H04N 7/15; H04N 7/155; H04N 7/147; H04N 19/593; H04N 7/0127; G06V 20/49;
(Continued)

(56) References Cited

U.S. PATENT DOCUMENTS

| | | |
|---|---|---|
| 4,710,917 A | 12/1987 | Tompkins |
| 6,388,654 B1 | 5/2002 | Platzker |

(Continued)

FOREIGN PATENT DOCUMENTS

| | | |
|---|---|---|
| CA | 2296189 C | 7/2001 |
| WO | 2017100753 A1 | 6/2017 |
| WO | 2019067704 A1 | 4/2019 |

OTHER PUBLICATIONS

A. Reinhardt "Video Conquers the Desktop", BYTE, Sep. 1993, pp. 64-90.
(Continued)

*Primary Examiner* — Melur Ramakrishnaiah

(57) ABSTRACT

An apparatus and method relating to use of a physical writing surface (132) during a videoconference or presentation. Snapshots of a whiteboard (132) are identified by applying a difference measure to the video data (e.g., as a way of comparing frames at different times). Audio captured by a microphone may be processed to generate textual data, wherein a portion of the textual data is associated with each snapshot. The writing surface may be identified (enrolled) using gestures. Image processing techniques may be used to transform views of a writing surface.

17 Claims, 17 Drawing Sheets

(51) Int. Cl.
*G06V 20/40* (2022.01)
*H04M 3/42* (2006.01)
*H04N 7/01* (2006.01)
*G10L 15/26* (2006.01)

(52) U.S. Cl.
CPC ...... *H04M 3/42221* (2013.01); *H04N 7/0127* (2013.01); *H04N 19/593* (2014.11); *G10L 15/26* (2013.01)

(58) Field of Classification Search
CPC ... G06V 20/44; G06V 20/48; H04M 3/52221; H04M 2201/50; H04M 7/0027; H04M 3/567
USPC .......................................... 348/14.01–14.16
See application file for complete search history.

(56) References Cited

U.S. PATENT DOCUMENTS

| | | | |
|---|---|---|---|
| 7,206,809 | B2 | 4/2007 | Ludwig |
| 7,372,991 | B2 | 5/2008 | Chen |
| 8,914,452 | B2 | 12/2014 | Boston |
| 9,300,912 | B2 | 3/2016 | Taneja |
| 9,706,168 | B1 | 7/2017 | Ludwig |
| 9,762,855 | B2 | 9/2017 | Browne |
| 2001/0020954 | A1 | 9/2001 | Hull |
| 2002/0180726 | A1 | 12/2002 | Shi |
| 2003/0234772 | A1 | 12/2003 | Zhang |
| 2004/0165786 | A1 | 8/2004 | Zhang |
| 2005/0047683 | A1 | 3/2005 | Pollard |
| 2005/0104901 | A1 | 5/2005 | Zhang |
| 2007/0011012 | A1 | 1/2007 | Yurick |
| 2007/0033528 | A1 | 2/2007 | Merril |
| 2007/0156816 | A1 | 7/2007 | Zhang |
| 2008/0316348 | A1 | 12/2008 | Hallock |
| 2011/0141278 | A1 | 6/2011 | Campbell |
| 2011/0197147 | A1 | 8/2011 | Fai |
| 2011/0275924 | A1 | 11/2011 | McLellan |
| 2012/0001999 | A1 | 1/2012 | Schirdewahn |
| 2012/0016960 | A1 | 1/2012 | Gelb |
| 2012/0274727 | A1 | 11/2012 | Robinson |
| 2015/0009278 | A1 | 1/2015 | Modai |
| 2015/0067536 | A1 | 3/2015 | Leorin |
| 2015/0106755 | A1 | 4/2015 | Moore |
| 2015/0121441 | A1 | 4/2015 | Apte |
| 2015/0127340 | A1 | 5/2015 | Epshteyn |
| 2015/0169069 | A1 | 6/2015 | Lo |
| 2015/0271446 | A1* | 9/2015 | Browne ............... H04N 7/15 348/14.08 |
| 2016/0124615 | A1 | 5/2016 | Jain |
| 2017/0115855 | A1 | 4/2017 | Farouki |
| 2018/0232192 | A1* | 8/2018 | Timoner ............. G09G 3/2003 |
| 2018/0279063 | A1 | 9/2018 | Sun |

OTHER PUBLICATIONS

Freeman and Shapira, "Determining the Minimum-Area Encasing Rectangle for an Arbitrary Closed Curve", Communications of the ACM, vol. 18 Issue 7, Jul. 1975, pp. 409-413.
G.T. Toussaint, "Solving Geometric Problems with the Rotating Calipers", Proc. Melecon '83, Athens (1983).
Manfred Del Fabro et al., "State-of-the-art and future challenges in video scene detection: a survey", Multimedia, Systems., vol. 19, No. 5, V=Feb. 22, 2013, pp. 427-454.
RealTime Board,:https://realtimeboard.com/features/, 36 pages.
Satoshi Suzuki et al., "Topological Structural Analysis of Digitized Binary Images by Border Following", in Computer Vision, Graphics, and Image Processing, vol. 30, Issue 1, Apr. 1985, pp. 32-46.
Trigg R H, "Computer support for transcribing recorded activity", Sigchi Bulletin, New York, NY, vol. 21, No. 2, Oct. 1, 1989, pp. 72-74.

* cited by examiner

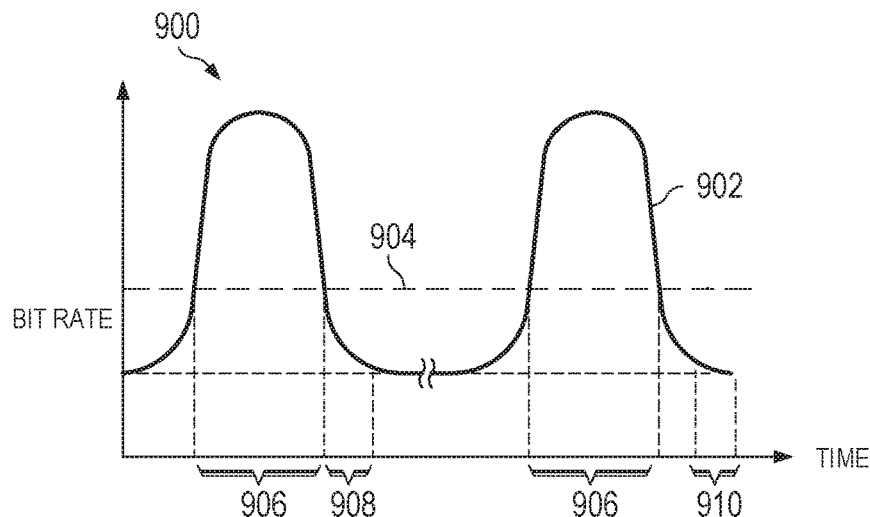
FIG. 9
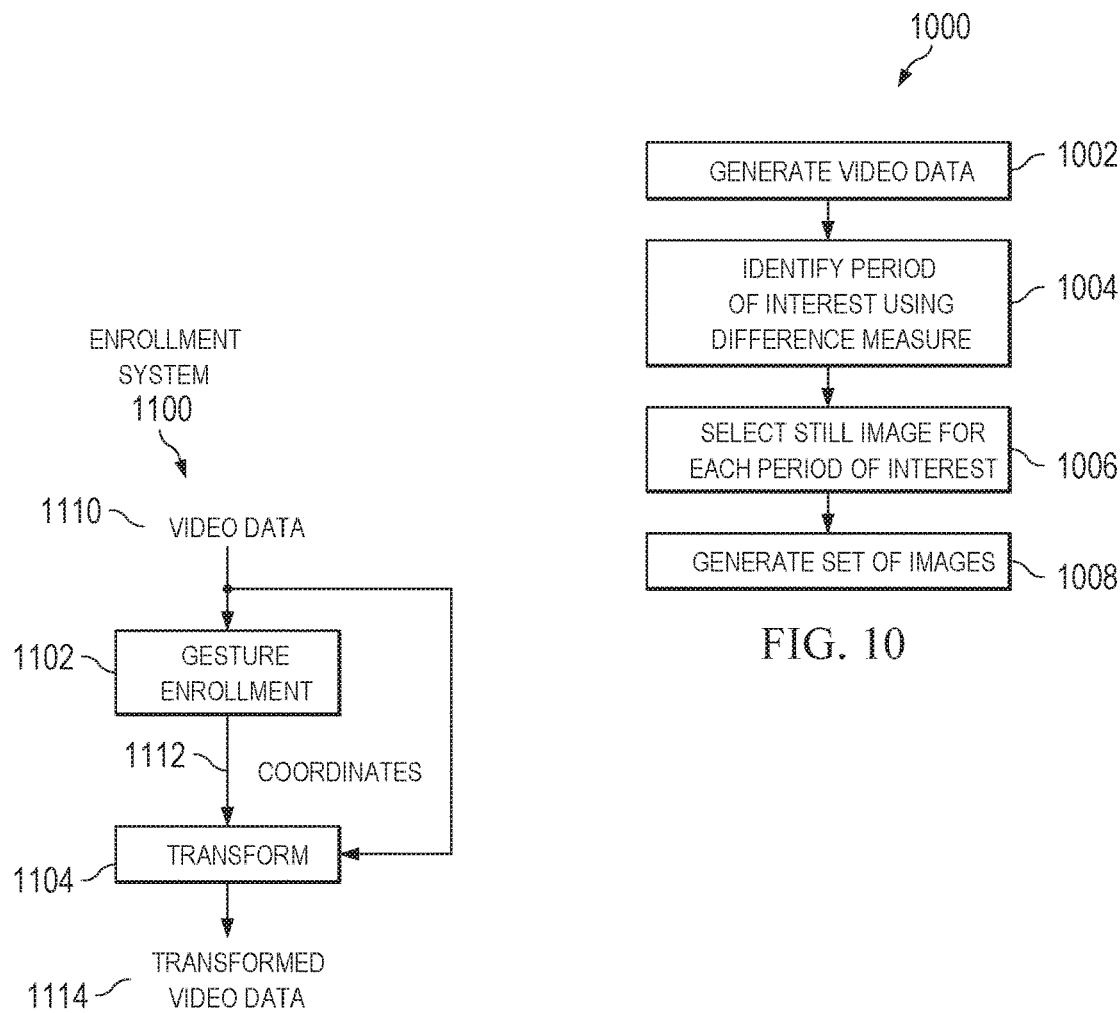
FIG. 10
FIG. 11

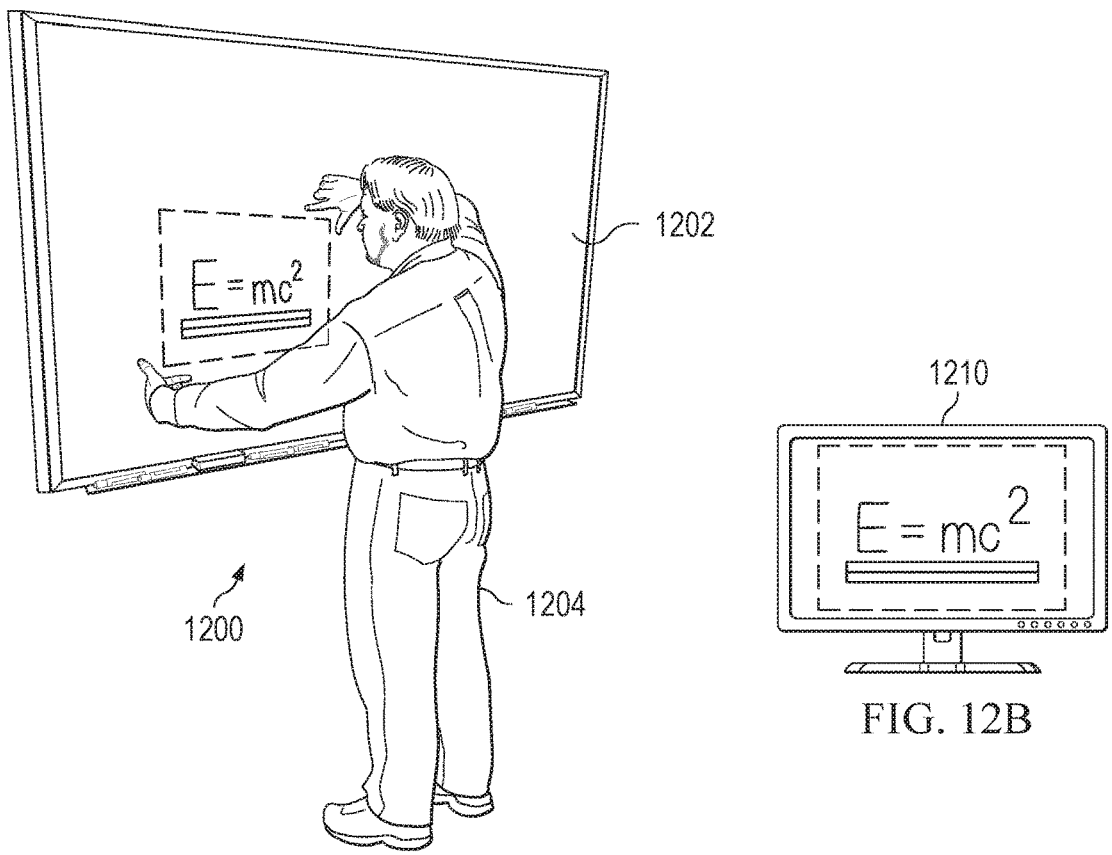
FIG. 12A
FIG. 12B
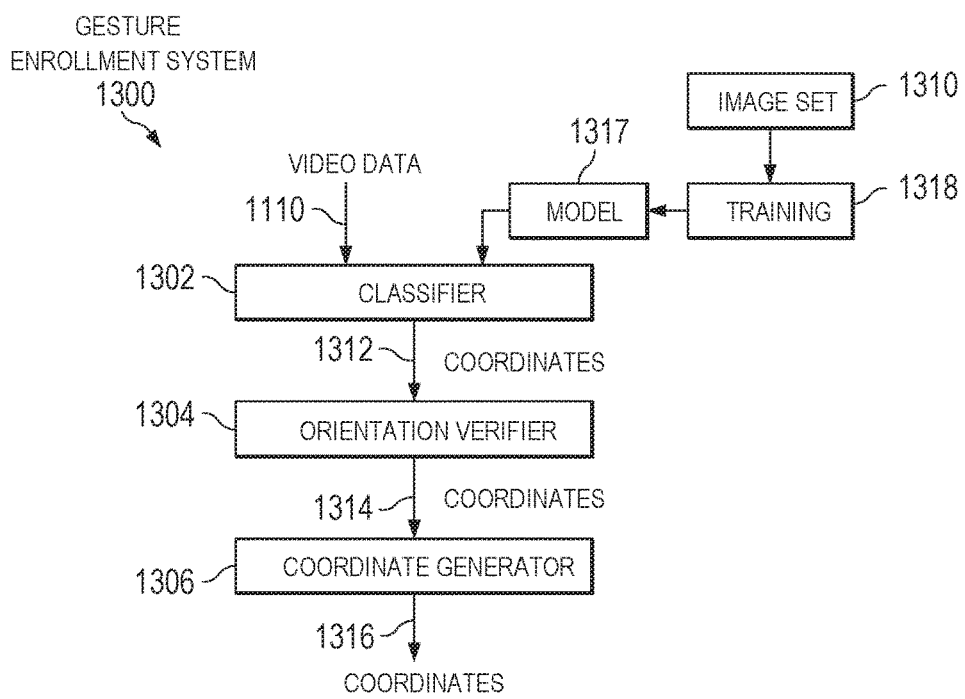
FIG. 13

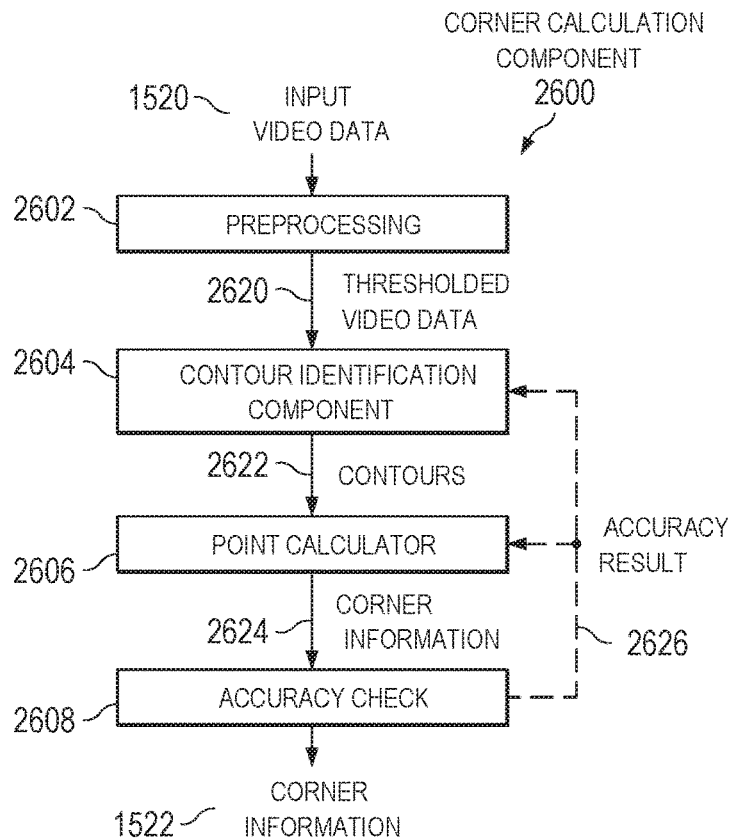
FIG. 26
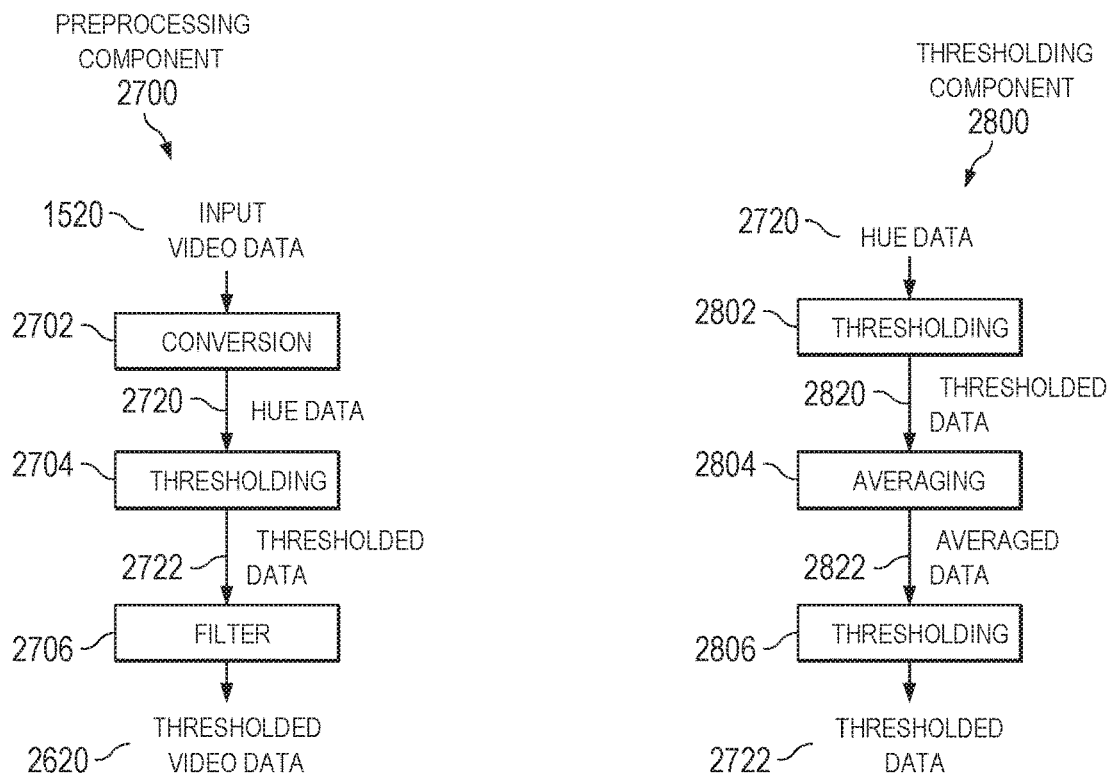
FIG. 27
FIG. 28

SHARING PHYSICAL WRITING SURFACES IN VIDEOCONFERENCING

CROSS REFERENCE TO RELATED APPLICATIONS

The present application claims the benefit of U.S. Provisional Application No. 62/792,219 filed on Jan. 14, 2019 and U.S. Provisional Application No. 62/958,124 filed on Jan. 7, 2020, which are incorporated herein by reference.

FIELD

The present disclosure relates to video transmission or recording for a videoconference or presentation, and in particular, to use of a whiteboard or other writing surface during the videoconference or presentation.

BACKGROUND

Unless otherwise indicated herein, the approaches described in this section are not prior art to the claims in this application and are not admitted to be prior art by inclusion in this section. Videoconferencing is a telecommunication technology allowing people at different locations to meet virtually, by communicating audio and video data that allows the participants of the videoconference to see and hear each other. A typical videoconferencing system comprises a number of endpoints that can communicate with each other via a data communication network. Each endpoint has one or more cameras for recording video of the participants at that endpoint. Each endpoint transmits its video to the other endpoints. The endpoints also have a display for displaying video received from other endpoints. Each endpoint is also equipped with at least one microphone to record audio, which is transmitted to the other endpoints, and with at least one speaker to play back audio received from other endpoints. Video capture is also beneficial in other circumstances, such as meetings, presentations and lectures. Similar to videoconferencing, an endpoint captures the video of the presentation. The recorded video may be stored for archival purposes, transmitted as with the videoconference, or otherwise played back at a later time.

SUMMARY

Described herein are techniques related to improvements in the use of physical writing surfaces during videoconferencing. Three general features are described.

According to a first feature, embodiments described herein are directed toward generating snapshots of a whiteboard captured on video.

According to an embodiment, a method generates a record of content appearing on a physical surface and captured on video. The method includes generating, by a video camera, video data that includes image data of the physical surface. The method further includes identifying, by applying a difference measure to the video data, at least one period of interest in the video data. The method further includes for each period of interest of the at least one period of interest, selecting a still image of the image data of the physical surface. The method further includes generating a set of images that includes each still image for the at least one period of interest in the video data, where the set of images provides snapshots of the content appearing on the physical surface.

The difference measure may correspond to a difference between a first filtering operation and a second filtering operation applied to the video data. The difference measure may correspond to a rate of the video data exceeding a threshold.

The video data may include a plurality of intra-frames, and the method may further include adjusting a rate at which the plurality of intra-frames is generated, where the rate is adjusted from a first rate to a second rate, where the first rate corresponds to meeting a bandwidth constraint for transmitting the video data using a first number of the plurality of intra-frames, and where the second rate corresponds to transmitting the video data using a second number of the plurality of intra-frames, where the second number is greater than the first number. Selecting the still image may be performed according to a two-state Hidden Markov Model applied to the video data.

According to another embodiment, an apparatus generates a record of content appearing on a physical surface and captured on video. The apparatus includes a processor and a memory. The processor is configured to control the apparatus to process video data, where the video data includes image data of the physical surface. The processor is configured to control the apparatus to identify, by applying a difference measure to the video data, at least one period of interest in the video data. The processor is configured to control the apparatus to select, for each period of interest of the at least one period of interest, a still image of the image data of the physical surface. The processor is configured to control the apparatus to generate a set of images that includes each still image for the at least one period of interest in the video data, where the set of images provides snapshots of the content appearing on the physical surface. The apparatus may additionally include similar details to those of one or more of the methods described herein.

According to a second feature, embodiments described herein are directed toward a method of enrolling a writing surface captured on video. The method includes receiving video data, where the video data captures a physical writing surface. The method further includes identifying an enrollment gesture by a user in the video data, where the enrollment gesture is associated with an area of the physical writing surface. The method further includes determining, in the video data, a set of coordinates corresponding to the enrollment gesture, where the set of coordinates is associated with the area of the physical writing surface identified by the enrollment gesture. The method further includes performing a geometric transform on the video data using the set of coordinates to generate transformed video data that corresponds to the area identified by the enrollment gesture.

According to another embodiment, an apparatus enrolls a writing surface captured on video. The apparatus includes a processor and a memory. The processor is configured to control the apparatus to receive video data, where the video data captures a physical writing surface. The processor is configured to control the apparatus to identify an enrollment gesture by a user in the video data, where the enrollment gesture is associated with an area of the physical writing surface. The processor is configured to control the apparatus to determine, in the video data, a set of coordinates corresponding to the enrollment gesture, where the set of coordinates is associated with the area of the physical writing surface identified by the enrollment gesture. The processor is configured to control the apparatus to perform a geometric transform on the video data using the set of coordinates to generate transformed video data that corresponds to the area identified by the enrollment gesture. The apparatus may additionally include similar details to those of one or more of the methods described herein.

According to a third feature, embodiments described herein are directed toward a method of sharing a writing surface captured on video. The method includes receiving video data, where the video data captures a physical writing surface and a region outside of the physical writing surface. The method further includes identifying, in the video data, a plurality of corners of the physical writing surface. The method further includes performing a geometric transform on the video data using the plurality of corners to generate second video data that corresponds to the physical writing surface excluding the region outside of the physical writing surface.

According to another embodiment, an apparatus shares a writing surface captured on video. The apparatus includes a processor and a memory. The processor is configured to control the apparatus to receive video data, where the video data captures a physical writing surface and a region outside of the physical writing surface. The processor is configured to control the apparatus to identify, in the video data, a plurality of corners of the physical writing surface. The processor is configured to control the apparatus to perform a geometric transform on the video data using the plurality of corners to generate second video data that corresponds to the physical writing surface excluding the region outside of the physical writing surface. The apparatus may additionally include similar details to those of one or more of the methods described herein.

According to another embodiment, a non-transitory computer readable medium stores a computer program that, when executed by a processor, controls an apparatus to execute processing including one or more of the methods discussed above.

The following detailed description and accompanying drawings provide a further understanding of the nature and advantages of various implementations.

BRIEF DESCRIPTION OF THE DRAWINGS

FIG. 9 shows a graph 900 that illustrates an implementation option for the selector component 504 (see FIG. 5).

FIG. 10 shows a flowchart of a method 1000.

FIG. 11 shows a block diagram of an enrollment system 1100.

FIG. 12A shows a perspective view showing an example frame of the video data.

FIG. 12B shows an example frame of the transformed video data.

FIG. 13 shows a block diagram of a gesture enrollment system 1300.

FIG. 26 is a block diagram of a corner calculation component 2600.

FIG. 27 is a block diagram of a preprocessing component 2700.

FIG. 28 is a block diagram of a thresholding component 2800.

DETAILED DESCRIPTION

Figure 1:
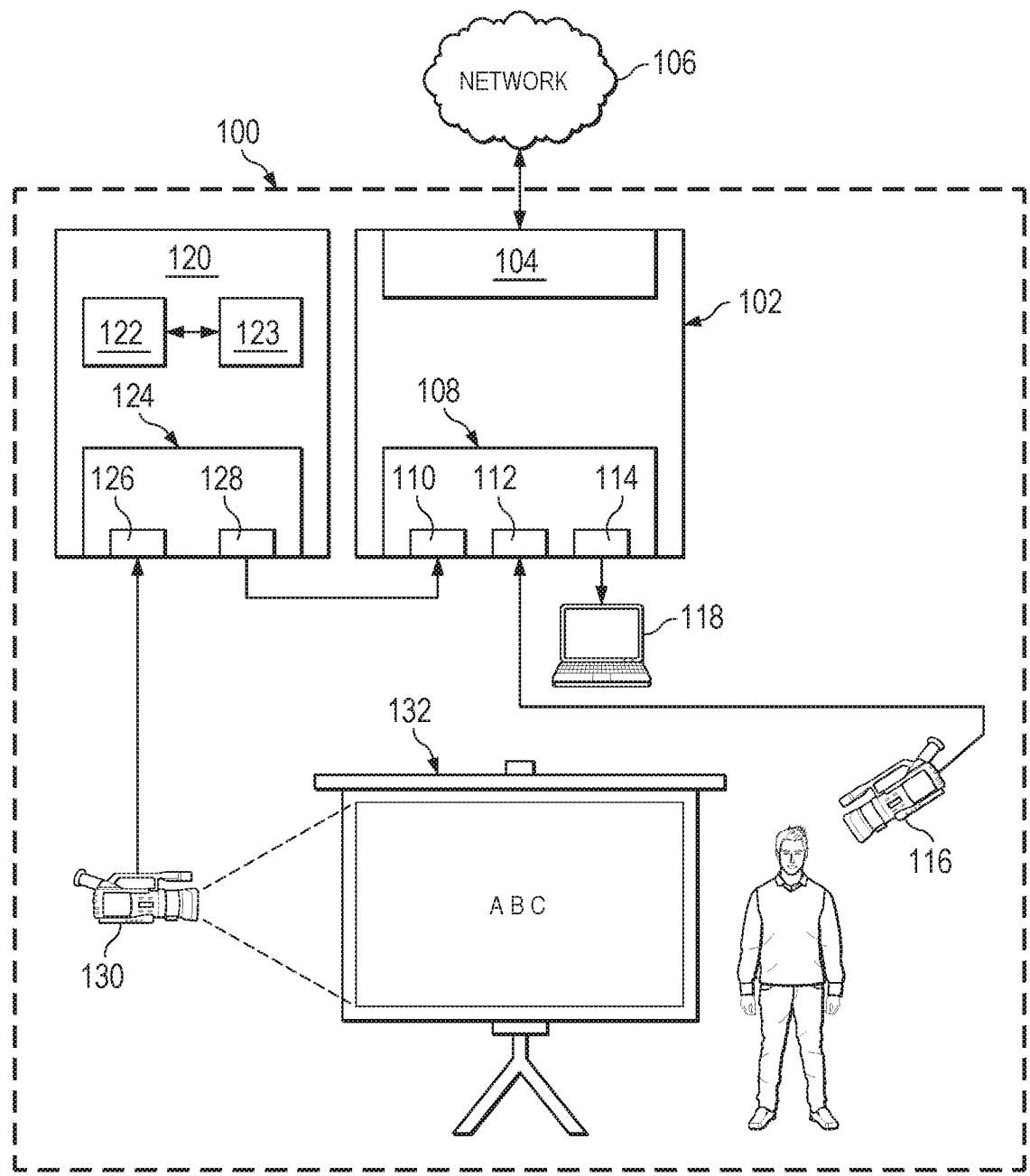
FIG. 1 shows a block diagram of a videoconferencing system 100.

Described herein are techniques related to use of a whiteboard or other writing surface during a videoconference or presentation. In the following description, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein.

In the following description, various methods, processes and procedures are detailed. Although particular steps may be described in a certain order, such order is mainly for convenience and clarity. A particular step may be repeated more than once, may occur before or after other steps (even if those steps are otherwise described in another order), and may occur in parallel with other steps. A second step is required to follow a first step only when the first step must be completed before the second step is begun. Such a situation will be specifically pointed out when not clear from the context.

In this document, the terms "and", "or" and "and/or" are used. Such terms are to be read as having an inclusive meaning. For example, "A and B" may mean at least the following: "both A and B", "at least both A and B". As another example, "A or B" may mean at least the following: "at least A", "at least B", "both A and B", "at least both A and B". As another example, "A and/or B" may mean at least the following: "A and B", "A or B". When an exclusive-or is intended, such will be specifically noted (e.g., "either A or B", "at most one of A and B").

Whiteboards and other types of physical writing surfaces are commonly used tools in meetings for presenting information. The writing on the whiteboard may be communicated during a videoconference.

As a replacement of these conventional physical writing surfaces, specialized hardware can be used that allows participants to write and draw on an electronic surface, such as a touch-sensitive display. This type of device is sometimes referred to as "digital blackboard" or "virtual whiteboard". The input written on the electronic surface is transmitted to the other endpoints of the videoconference as a digital signal. A drawback of these devices is that they are relatively expensive, both in terms of purchasing and in terms of maintenance. Moreover, these devices are less intuitive to operate than conventional low-tech writing surfaces. Embodiments are directed toward improvements in the use of physical writing surfaces during videoconferencing. These improvements are generally categorized as follows: I. Whiteboard Snapshotting, II. Gesture Enrollment, and III. Sharing a Writing Surface.

I. Whiteboard Snapshotting

A drawback of conventional physical writing surfaces in a videoconferencing environment is that there is not a convenient way to generate a record of the writing on the whiteboard (aside from recording the videoconference itself).

Embodiments are directed toward systems and methods of performing snapshotting of the videoconference to generate a record of the writing on the whiteboard.

FIG. 1 shows a block diagram of a videoconferencing system 100. The videoconferencing system 100 comprises a videoconferencing endpoint 102. For example, endpoint 102 may be a videoconferencing client. The endpoint 102 has a network interface 104 for communicating to other videoconferencing endpoints, e.g. for direct communication with other videoconferencing clients or to a videoconferencing server that manages communication between two or more videoconferencing clients connected thereto. The network interface 104 communicates via a data communication network 106. The data communication network 106 is for example a packet network, such as an IP network. For example, the data communication network is a Local Area Network (LAN) or Wide Area Network (WAN). In the example shown, network 106 is the internet.

The endpoint 102 further comprises a video input/output (I/O) component 108, that comprises multiple video interfaces for input and output of video signals. The I/O component 108 has a display input connector 110 for connecting a computer for receiving an input video signal. In the example shown, the input connector 110 is an HDMI input connector.

The I/O component 108 further comprises an input connector 112 for receiving camera signals, and a display output connector 114. The input connector 112 is connected to a camera 116 of the videoconferencing system 100, to capture a video of participants of the videoconference. In the example shown, the camera 116 is connected to input connector 112 via a cable. The video captured by camera 116 is transmitted to the endpoint 102, which transmits the video via network 106 to other endpoints of the videoconference using the network interface 104.

The output connector 114 of the I/O component 108 is connected to a display 118 of the videoconferencing system. In the example shown, the output connector 114 is an HDMI output connector, connected to an HDMI input of the display 118 using an HDMI cable. The endpoint 102 is configured to receive one or more videos transmitted by other participants over the network 106 using the network interface 104, and to output a corresponding video signal to the display 118.

The system 100 further comprises a computing apparatus 120. The computing apparatus 120 comprises a display controller 122 for generating an output video signal for output on a display, and a processor 123. In the example shown, the display controller 122 and the processor 123 of the computing apparatus are embodied as two or more separate components, which are connected to each other for exchanging data. For example, the display controller 122 may be implemented as part of a graphics processing unit (GPU), whereas the processor 123 comprises a central processing unit (CPU). Alternatively, the display controller 122 and the processor 123 may be embodied as a single processing component that is configured to perform the functionality of both the display controller 122 and the processor 123.

The computing apparatus 120 also comprises an I/O component 124, that has an input connector 126 for receiving camera signals, and a display output connector 128 for output of video signals generated by the display controller 122. The input connector 126 is connected to a camera 130 that is configured to capture video of a physical writing surface 132. In the example shown, the physical writing surface 132 is a whiteboard, however the system 100 may also be used to capture video of other writing surfaces, such as a flip chart or a black board. In the example shown, the camera 130 is connected to the input connector 126 using a cable. For example, the input connector 126 is a USB connector, for connecting camera 130 via a USB cable.

The I/O component 124 is connected to the display controller 122 and the processor 123 for communication of video data received via input connector 126 to the processor 123 and for output of an output video signal generated by the display controller 122 via an output connector 128. The processor 122 receives a sequence of video frames of the whiteboard 132 as captured by the camera 130. The processor 122 may be configured to generate processed video data by applying a video enhancement process to the sequence of video frames. The video enhancement process enhances the legibility of pen strokes, e.g. text and drawings, on the physical writing surface.

The output connector 128 of the computing apparatus 120 is connected to the video input connector 110 of the videoconferencing endpoint 102. In the example shown, the input connector 110 and the output connector 128 are both HDMI connectors, and the connectors 110 and 128 are connected via an HDMI cable. The computing apparatus 120 is configured to output an enhanced video signal corresponding to the processed video data as generated by the processor 123. The enhanced video signal is output from the computing apparatus to the videoconferencing endpoint 102 via the cable connecting connectors 110 and 128.

In the example of FIG. 1, an HDMI video interface is used for connectors 110, 114 and 128. However, the present disclosure is not limited to an HDMI video interface, and other types of video interfaces may be used additionally or alternatively, such as S-video, DVI, composite video, component video, DisplayPort, FireWire, VGA or SCART.

The display input connector 110 of the video conferencing endpoint 102 is intended for connecting a computer, to share a screen of the computer. For example, in a typical videoconferencing scenario, the display input connector 110 is connected to a computer running presentation software, such as Microsoft PowerPoint, to share the slides of the presentation with the other participants of the videoconference. In this scenario, the videoconferencing enables other participants to view the slides together with the image of the person presenting as recorded by the camera 116. However, in the embodiments described in more detail herein, the display input connector 110 is used in a manner different from its intended use, by connecting a computing apparatus 120 and thereby providing to the endpoint 102 a video signal corresponding to a processed version of the video captured by an additional camera 130. Therefore, a participant in a first room can use a conventional whiteboard 132, while the content he writes on the whiteboard is shared in a clearly readable way with the other participants. Moreover, the other participants can still watch the first room, as the video camera 116 of the endpoint 102 is still available to share video of the first room.

The camera 130 may optionally be a relatively low-quality camera, as compared to the camera 116 for capturing the participants, as the images of the content written on the whiteboard 132 may be processed to increase legibility before transmission to other participants. For example, the resolution of the camera 130 may be lower than the resolution of camera 116.

In an example, the computing apparatus 120 is a portable device. For example, the apparatus 120 may be a laptop, a tablet or a smartphone. The camera 130 may also be a portable device. In an example, the camera 130 is an integrated part of the computing apparatus 120, e.g. an integrated webcam of a laptop. In another example, the camera 130 and the computing apparatus 120 are separate components, e.g. the computing apparatus is a laptop that is connected to a USB webcam.

By providing the computing apparatus and the camera connected thereto as a portable system, they can be shared across multiple videoconferencing rooms. In contrast, conventional devices for sharing written content, such as digital blackboards and virtual whiteboards, are typically large and heavy wall-mounted devices, such that moving this type of equipment between multiple rooms is not practical.

In an example, the computing apparatus 120 is a screenless device. In other words, the computing apparatus has no display. This has the advantage that the apparatus can have a small form factor. Examples of screen-less computing devices having a small form factor include Intel® Compute Stick, InFocus Kangaroo and Raspberry Pi. The computing apparatus 120 may for example be a single board computer.

In an example, the computing apparatus 120 is a dongle. A dongle is a device having a small form factor, and at least one connector for connecting the dongle to another device. In the present example, the dongle comprises the video interface output connector 128. The video interface output connector 128 is connectable to the input connector 110 of the videoconferencing endpoint 102. The dongle may for example be powered by connecting to mains power via a power adapter or by power over USB, wherein the dongle may be connected to an USB port of the videoconferencing endpoint 102 if available.

As an alternative, the computing apparatus 120 may be a component of the endpoint 102. The endpoint 102 may implement a snapshotting process, as further described below. Alternatively, the computing apparatus 120 may implement the snapshotting process.

Figure 2:
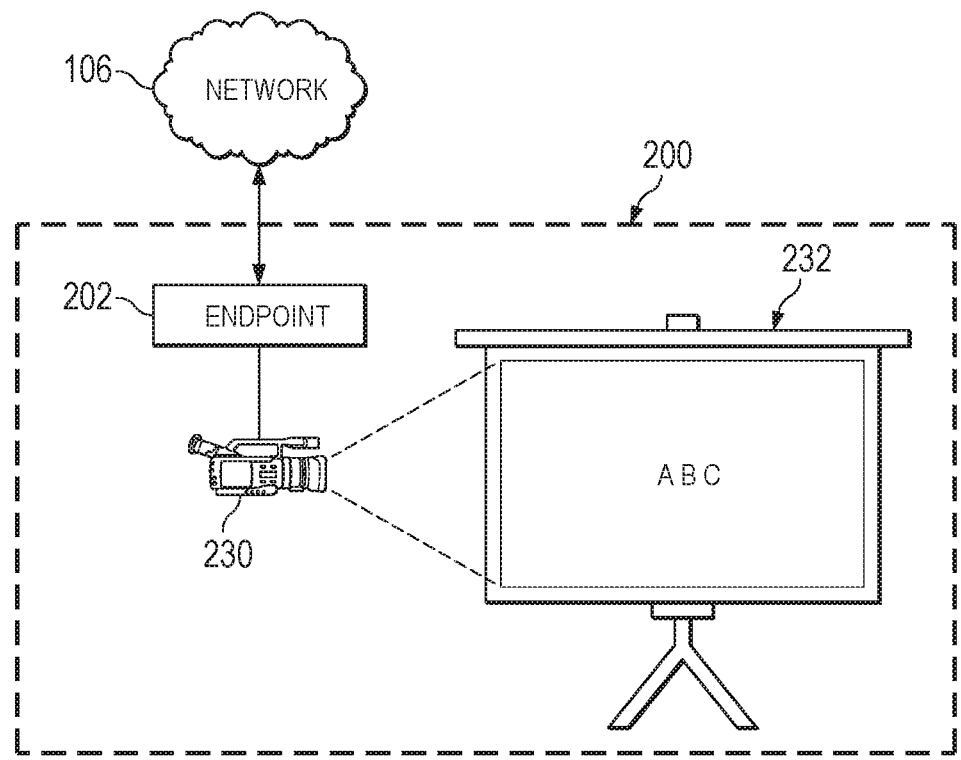
FIG. 2 shows a block diagram of a videoconferencing system 200.

FIG. 2 shows a block diagram of a videoconferencing system 200. The videoconferencing system 200 comprises a videoconferencing endpoint 202. The endpoint 202 may include all, or less than all, of the features of the endpoint 102. The endpoint 202 connects to a camera 230 that captures video data of a whiteboard 232, as discussed above regarding the camera 130 and whiteboard 132 (see FIG. 1). The endpoint 202 connects to the network 106, as discussed above regarding FIG. 1. As a further example, the camera 230 may include one or more components of the endpoint 202 (e.g., the snapshotting components, as further described below).

Alternatively, the endpoint 202 corresponds to a computer system that implements a screen sharing function. In such an embodiment, the video data corresponds to the screen sharing data, and the camera 230 may be omitted. As another alternative, the endpoint 202 corresponds to a presentation capture system, e.g. for recording a lecture. In such an embodiment, the video data may not be necessarily transmitted contemporaneously with the presentation (as may be the case for a videoconference).

The endpoint 202 may implement a snapshotting process, as further described below.

Figure 3:
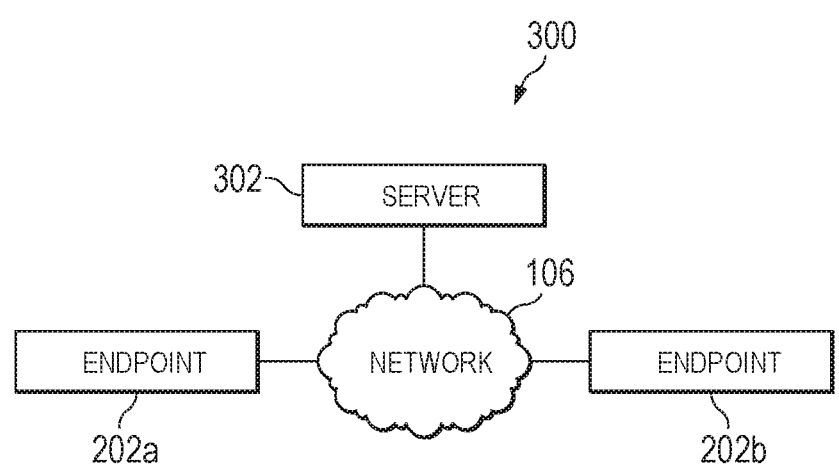
FIG. 3 shows a block diagram of a system 300.

FIG. 3 shows a block diagram of a system 300. The system 300 may be more specifically referred to as a videoconferencing system or a recording system, depending upon the implementation options further discussed below. The videoconferencing system may be used in a videoconferencing environment. The recording system may be used in another environment that may not necessarily involve real-time transmission of the video, such as a lecture environment, a presentation environment, a meeting environment, etc.

As one alternative, the system 300 implements a videoconferencing system that includes a number of endpoints 202 (see FIG. 2); two endpoints 202 are shown, 202*a* and 202*b*. The endpoint 202*a* is referred to as the transmitting endpoint and the endpoint 202*b* is referred to as the receiving endpoint. (Note that the terms transmitting and receiving are provided for ease of description; the endpoint 202*a* may also receive, and the endpoint 202*b* may also transmit.) The system 300 may also include a server 302. When present, the server 302 communicates data from the transmitting endpoint 202*a* to the other endpoints 202. When the server 302 is not present, the transmitting endpoint 202*a* transmits data to the other endpoints 202. The network 106 (see FIG. 1) connects the endpoints 202 and (when present) the server 302.

One or more of the components of the system 300 may implement a snapshotting process, as further described below. For example, the transmitting endpoint 202a may perform snapshotting as it is transmitting the video data. (The transmitting endpoint 202a may perform snapshotting using the native resolution of the camera 320, which may be a higher resolution than that transmitted.) As another example, the receiving endpoint 202b may perform snapshotting of the video data received from the transmitting endpoint 202a. As another example, the server 302 (when present) may perform snapshotting of the video data received from the transmitting endpoint 202a.

As another alternative, the system 300 implements a recording system. The recording system has one or more endpoints 202 and the server 302, but the endpoints 202 need not necessarily transmit the video data they capture; the server 302 performs the snapshotting process on the captured video data (contemporaneously with the video data being generated, afterwards on stored video data, etc.). For example, the endpoints 202 may be located at various lecture hall locations, the server 302 hosts the snapshotting service, and the endpoints access the server 302 via web services to use the snapshotting service.

Figure 4:
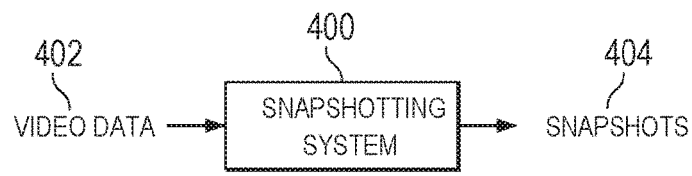
FIG. 4 shows a block diagram of a snapshotting system 400.

FIG. 4 shows a block diagram of a snapshotting system 400. The snapshotting system 400 may be implemented as a component of one of the elements of a videoconferencing system or a recording system (see FIG. 3), such as the transmitting endpoint 202a, the receiving endpoint 202b, the server 302, etc. The snapshotting system 400 may be implemented by one or more computer programs executed by a processor.

The snapshotting system 400 receives video data 402 and generates one or more snapshots 404 from the video data. In general, the video data 402 corresponds to the videoconference data transmitted by the transmitting endpoint 202a. As one example, the video data 402 corresponds to video of the whiteboard 232 captured by the video camera 230 (see FIG. 2). As another example, the video data 402 corresponds to screen sharing data corresponding to information displayed on a display screen (e.g., when the transmitting endpoint 202a corresponds to a computer system). The snapshots 404 correspond to still images of the video data 402 at selected times.

The snapshotting system 400 provides the snapshots 404 to other devices. According to one option, the snapshotting system 400 provides the snapshots 404 as each snapshot is generated. According to another option, the snapshotting system 400 provides the snapshots 404 at a later time, for example by processing the video data 402 at the completion of the videoconference. The snapshotting system 400 may provide the snapshots 404 to other devices (e.g., the endpoints 202 of FIG. 3 in a recording system environment), to devices involved in the videoconference (e.g., the endpoints 202 of FIG. 3 in a videoconference environment), to devices not involved in a videoconference, etc.

The snapshotting system 400 may provide the snapshots 404 via a communications channel other than that used for transmitting the video data 402. For example, the snapshotting system 400 may provide the snapshots 404 via email. Alternatively, the snapshotting system 400 may provide the snapshots 404 via the same communications channel as that used for transmitting the video data 402. For example, the snapshots 404 may be provided as thumbnail images overlaid on a corner or edge of the video data 402.

Figure 5:
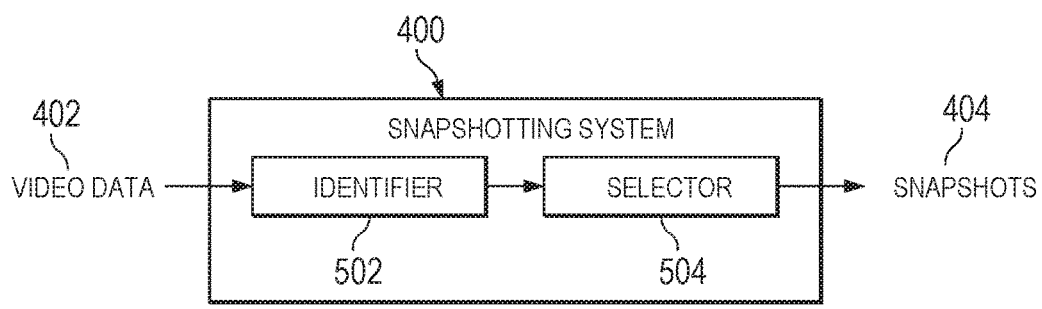
FIG. 5 shows a block diagram showing further details of the snapshotting system 400 (see FIG. 4).

FIG. 5 shows a block diagram showing further details of the snapshotting system 400 (see FIG. 4). The snapshotting system 400 includes an identifier component 502 and an image selector component 504. The identifier component 502 generally identifies periods of interest in the video data 402. Periods of interest, and ways to identify them, are further discussed below. The image selector component 504 generally selects a still image (e.g., a frame) from the video data 402 that corresponds to a period of interest identified by the identifier component 502. The collection of still images selected by the image selector component 504 correspond to the snapshots 404.

Figure 6:
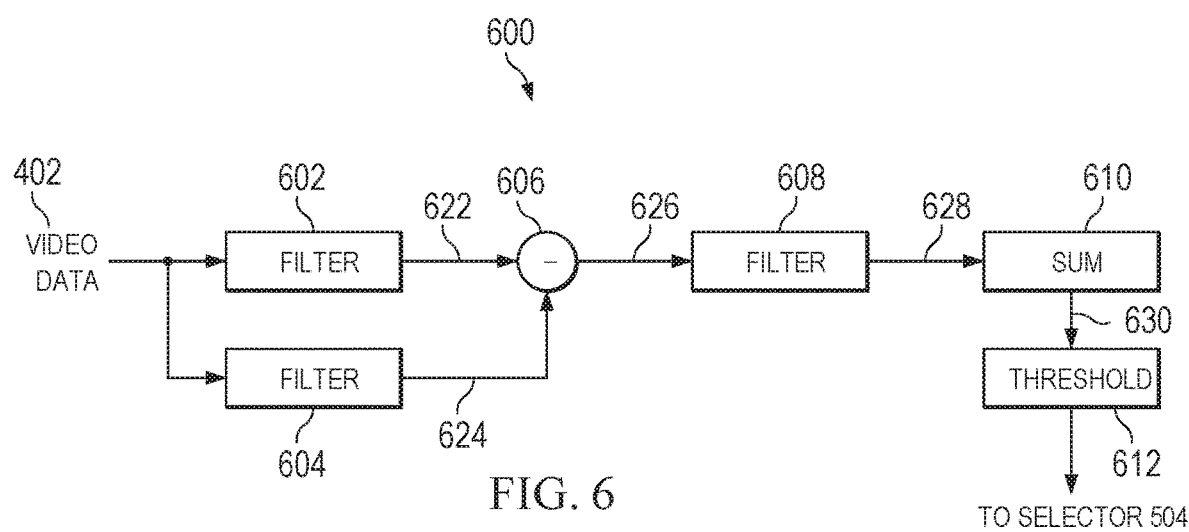
FIG. 6 shows a block diagram of an identifier component 600.

FIG. 6 shows a block diagram of an identifier component 600. The identifier component 600 is an example implementation of the identifier component 502 (see FIG. 5). The identifier component 600 includes a filter component 602, a filter component 604, a subtraction component 606, a filter component 608, a summing component 610, and a thresholding component 612.

The filter component 602 and the filter component 604 receive the video data 402 (see FIG. 5) and each perform filtering of the video data 402 to generate a first filtered image 622 and a second filtered image 624. As one example, the filter component 602 and the filter component 604 may implement infinite impulse response (IIR) filters to generate the first filtered image 622 and the second filtered image 624.

As another example, the filter component 602 and the filter component 604 may perform filtering over a time period, referred to as a window. In this example, the filter component 602 operates over a first window applied at a first given time in the video data 402 to generate the first filtered image 622, and the filter component 604 operates over a second window applied at a second given time in the video data 402 to generate the second filtered image 624. In general, the combination of the size of the first window and the first given time (for the filter component 602) is different from the combination of the size of the second window and the second given time (for the filter component 604). As one example, the first window and the second window may have different sizes, and the first given time and the second given time may be the same. As another example, the first window and the second window may have the same size, and the first given time and the second given time may be different. As another example, the first window and the second window may have different sizes, and the first given time and the second given time may be different. As a result, the outputs of the filter component 602 and the filter component 604 may differ as the video data 402 changes over time. The window sizes may be defined in terms of a selected number of frames in the video data 402.

As an example, consider an embodiment in which the frame rate may range between 10 and 60 frames per second; the first window size is selected in the range from 30 to 300 seconds (e.g., 60 seconds); and the second window size is selected in the range from 5 to 30 seconds (e.g., 15 seconds).

The filter component 602 and the filter component 604 may implement a number of filtering processes to compute the first filtered image 622 and the second filtered image 624. As an example, the filter components may store a history of the frames and compute a temporal average (e.g., a finite impulse response average or moving average). As another example, the filter components may implement an accumulator that computes an autoregressive or infinite impulse response average. (The infinite impulse response embodiment may use time constants instead of window sizes.)

The filter component 602 and the filter component 604 may operate on a cropped portion of the video data 402 that has been cropped to include only the whiteboard. Generating the cropped video data may be implemented as described in International Application No. PCT/US2018/053097.

The subtraction component 606 generates a difference image 626 that corresponds to the difference (if any) between the first filtered image 622 (output from the filter component 602) and the second filtered image 624 (output from the filter component 604). For example, when the filter component 602 and the filter component 604 perform filtering on frames of the video data 402, their outputs are respectively a first filtered frame and a second filtered frame; the subtraction component 606 outputs a difference frame where each pixel is the difference between the corresponding two pixels in the first filtered frame and the second filtered frame.

The pixel values may range from 0 to 255, and the identifier component 600 may operate on the absolute value of the difference in the pixel values between the two images 622 and 624. In addition, the identifier component 600 may perform further thresholding, to normalize the pixel values of the difference image 626 to either 0 (when 127 or less) or 255 (when greater than 127), between the subtraction component 606 and the filter component 608.

The filter component 608 performs filtering on the difference image 626 output from the subtraction component 606 to generate a filtered difference image 628. The filtering removes small differences in the difference image 626 that may result from camera noise. The filtering component 608 may perform the filtering using a spatial filter (e.g., erosion). For example, the filtering component 608 may perform erosion using a 2×2 matrix of ones on the difference image 626. In general, an erosion operation applied to dark writing on a white background increases the line thickness of the writing.

The summing component 610 sums the pixel values in the filtered difference image 628 to generate a sum 630. In general, the sum 630 will be proportional to the (filtered) difference between the first filtered image 622 and the second filtered image 624.

The summing component 610 may operate on the intensity values of the pixels, which may be in black/white, grayscale, or color (such as RGB—red, green and blue). For RGB pixels, the camera 230 (see FIG. 2) may perform white balancing (which adjusts the R and B pixel intensities), so the summing component 610 may operate using the G pixel intensities.

The thresholding component 612 compares the sum 630 to a threshold and provides the result of the comparison to the image selector component 504 (see FIG. 5). When the sum 630 exceeds the threshold, the result indicates that the identifier component 600 has found a period of interest in the video data 402. As an example, the threshold may be 20, 30, etc. As another example, the threshold may be defined as a mean value that accounts for varying sizes or resolutions of the video data 402. (So combining the two examples, for video at 1920×1080 resolution, the threshold of 20 corresponds to a mean value of $1/103680$.) The threshold may be adjusted as desired; increasing the threshold will result in fewer periods of interest being identified.

Figure 7:
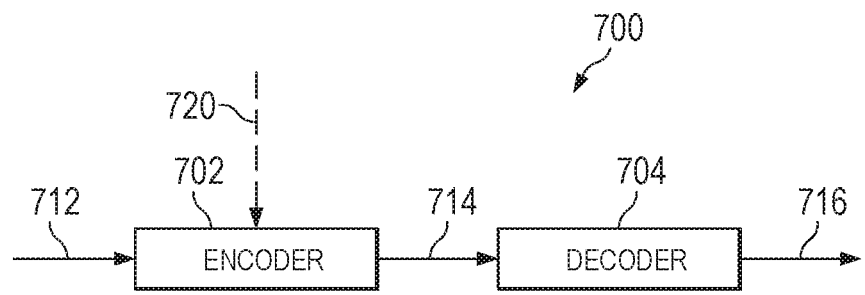
FIG. 7 shows a block diagram of an identifier component 700.

FIG. 7 shows a block diagram of an identifier component 700. The identifier component 700 is an example implementation of the identifier component 502 (see FIG. 5). The identifier component 700 includes an encoder component 702 and a decoder component 704. The identifier component 700 is distributed, with the encoder component 702 located on the client side (e.g., as a component of the transmitting endpoint 202a of FIG. 3), and the decoder component 704 located on another side (e.g., as a component of the video-conferencing server 302 of FIG. 3, as a component of the receiving endpoint 202b of FIG. 3, etc.).

The encoder component 702 receives an uncompressed video stream 712 and performs encoding on the uncompressed video stream 712 to generate a compressed video stream 714. For example, the uncompressed video stream 712 may correspond to raw video captured by the camera 230 (see FIG. 2), and the encoder component 702 may perform encoding according to a selected video standard, such as the ITU-T H.264 standard or the ITU-T H.265 standard. The compressed video stream 714 is then transmitted in the course of the videoconference, e.g., from the transmitting endpoint 202a via the network 106 (see FIG. 3). The decoder component 704 receives the compressed video stream 714 and performs decoding on the compressed video stream 714 to generate video data 716. The video data 716 may include intra-frames.

The video data 716 may then be processed by the identifier component 600 (see FIG. 6) as the video data 402 to identify the periods of interest. When the video data 716 includes intra-frames, the intra-frames in the periods of interest may be used as the snapshots 404 (see FIG. 5).

As an option, the encoder component 702 may receive an intra-frame threshold 720 and may adjust a rate of the intra-frames in the compressed video stream 714 according to the intra-frame threshold 720. In the absence of the intra-frame threshold 720, the encoder component 702 may generate intra-frames at a first rate in order to meet a bandwidth constraint. (Intra-frames use more data than predicted frames or bidirectional predicted frames, so meeting the bandwidth constraint results in a given number of intra-frames and a given number of the other frames.) The intra-frame threshold 720 may adjust the rate of intra-frames from the first rate to a second rate. In general, the second rate will be greater than the first rate, so the number of other frames may be reduced; or alternatively, the bandwidth constraint may be exceeded.

As a result of adjusting the rate of intra-frames according to the intra-frame threshold 720, the encoder component 702 may generate the compressed video stream 714 to meet a criterion for generating the snapshots 404 (e.g., to adjust the encoding so that a desired number of intra-frames result), instead of just meeting a bandwidth criterion. Alternatively, the encoder component 702 may identify the intra-frames directly, and select each identified intra-frame as the snapshot (that may be sent via email, etc.).

Figure 8:
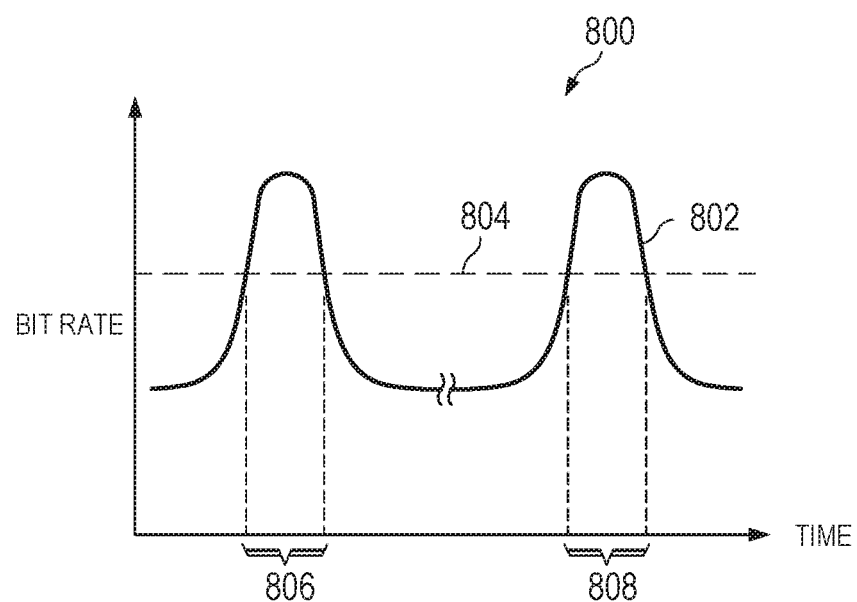
FIG. 8 shows a graph 800 that illustrates an implementation option for the identifier component 502 (see FIG. 5).

FIG. 8 shows a graph 800 that illustrates an implementation option for the identifier component 502 (see FIG. 5). The x-axis of the graph 800 is time, and the y-axis is bit rate. The plot 802 corresponds to the bit rate of the video data 402 (see FIG. 5) over time. Most of the time, the plot 802 is below a threshold 804. In general, when the plot 802 is below the threshold 804, this corresponds to not much changing in the video data 402. When the plot 802 exceeds the threshold 804, the identifier component 502 identifies a period of interest corresponding to the region exceeding the threshold 804. In general, when the plot 802 exceeds the threshold 804, the images captured in the video data 402 are changing. For example, there may be changes to the writing on the whiteboard, a slideshow may transition from one slide to the next slide, etc. and these changes are associated with the video data 402 changing.

The regions 806 and 808 correspond to the periods of interest identified by the identifier component 502.

The identifier component 502 may implement a number of options for the threshold 804. One option is that the identifier component 502 stores a corresponding threshold for each combination of encoding scheme and resolution for the video data 402. Another option is that the identifier component 502 adjusts the threshold over the duration of the video, for example to lower the threshold if a snapshot has not been generated within a given time period, or to increase the threshold if more than a given number of snapshots have been generated within a given time period. Another option is, for recorded video data, to analyze the entirety of the video data and set the threshold such that a target number of snapshots are generated for a given length of video.

As compared to other options for the identifier component 502 (such as the identifier component 700), decoding is not required when analyzing the bit rate of the video data 402. Thus, an identifier component that implements the bit rate identification of FIG. 8 may omit a decoder component.

FIG. 9 shows a graph 900 that illustrates an implementation option for the selector component 504 (see FIG. 5). The x-axis of the graph 900 is time, and the y-axis is bit rate. The plot 902 corresponds to the bit rate of the video data 402 (see FIG. 5) over time. As with the plot 802 (see FIG. 8), when the plot 902 exceeds the threshold 904, the identifier component 502 identifies a period of interest 906. When the identifier component 502 has identified a period of interest, the selector component 504 selects an image from the video data 402. The selector component 504 may make this selection at various times for a given period of interest. One option is to select the image from the video data 402 at a time within the period 906. For example, the image may be selected in the middle of the period 906, at the end of the period 906, etc. Another option is to select the image from the video data 402 within a defined period (e.g., 100 ms) after the period 906; in such a case, both the period 906 and the subsequent defined period may be referred to as the period of interest.

Another option is to select the image from the video data 402 at a time when the plot 902 has transitioned below the threshold 904 and remains below the threshold 904 for a defined period (e.g., in the range of 300-1500 ms), shown as the period 908. In such a case, the image may be selected from within the period 906, from within the period 908, at the end of the period 908, etc.; and the entirety of 906 and 908 may be referred to as the period of interest.

Another option is to select the image from the video data 402 at a time when the plot 902 has transitioned below the threshold 904 and has returned (for a defined period, e.g. 100 ms) to the bit rate prior to the threshold 904 being exceeded, shown as the period 910. In such a case, the image may be selected from any time from the start of 906 to the end of 910; in such a case, the entire period from the start of 906 to the end of 910 may be referred to as the period of interest. If the image is selected when the video data 402 is below the threshold 904, the image is more likely to correspond to a static image than if the image were selected when the video data 402 is above the threshold (which likely corresponds with changes in the images captured in the video data 402).

The selector component 504 may implement a two-state Hidden Markov Model to identify whether the bit rate is in the high bit rate state (e.g., above the threshold) or the low bit rate state (e.g., below the threshold). The model may use a Gaussian emission distribution over bit rate in each state.

Similar selections of the image may be made when the period of interest is identified according to other processes, such as by the identifier component 600 (see FIG. 6). For example, the period of interest identified by the identifier component 600 may include a defined period (e.g., 100 ms) once the threshold returns below the threshold, and the image may be selected from within that defined period.

FIG. 10 shows a flowchart of a method 1000. The method 1000 generates a record of content (e.g., snapshots) appearing on a physical surface (e.g., a whiteboard) and captured on video (e.g., as part of a videoconference, when recording a presentation, etc.). The method 1000 may be performed by one or more components of the system 300 (see FIG. 3).

At 1002, a video camera generates video data that includes image data of a physical surface. For example, the video camera 230 (see FIG. 2) may generate video data that includes image data of the whiteboard 232. In a videoconferencing environment, the endpoint (e.g., the endpoint 202a of FIG. 3) may transmit the video data to other devices. In a recording environment, the endpoint (e.g., the endpoint 202 of FIG. 2) may not necessarily transmit the video data.

At 1004, at least one period of interest in the video data is identified by applying a difference measure to the video data. For example, the difference measure may be generated by an identifier component, such as the identifier component 502 (see FIG. 5), the identifier component 600 (see FIG. 6), the identifier component 700 (see FIG. 7), etc. The difference measure may correspond to differences in pixels (as discussed in relation to the identifier component 600). As an example, the difference measure may correspond to a difference between a first filtering operation and a second filtering operation applied to the video data. As a further example, the difference measure may correspond to a difference between a first temporal window and a second temporal window applied to the video data. The difference measure may correspond to differences in bit rate (as discussed in relation to the identifier component 700), etc. For example, the difference measure may correspond to a rate of the video data exceeding a threshold.

Various components may perform the identification of the periods of interest. As one example, the endpoint 202 (see FIG. 2) may perform the identification; for a system that has more than one endpoint, the transmitting endpoint 202a (see FIG. 3) may perform the identification, the receiving endpoint 202b may perform the identification, etc. As another example, the server 302 may perform the identification.

If the system is also transmitting the video data, the system has a number of options for identifying the periods of interest. According to one option, the system identifies the periods of interest contemporaneously with transmitting the video data. According to another option, the system does not necessarily identify the periods of interest contemporaneously with transmitting the video data. For example, the system may identify the periods of interest after the transmission has been completed, or at an end of the video data.

At 1006, a still image of the image data of the physical surface is selected for each period of interest (identified at 1004). For example, the selector component 504 (see FIG. 5) may select the image for each period of interest. As discussed above with reference to FIG. 9, the image may be selected from within a period (e.g., 906, 908, 910, etc.) that corresponds to the period of interest. Depending on the encoding of the image data, the still image may correspond to a frame (e.g., an intra-frame).

At 1008, a set of images is generated that includes each still image (selected at 1006) for the periods of interest (identified at 1004). In general, the set of images provides snapshots of the content appearing on the physical surface.

The snapshotting system (e.g., the snapshotting system 400 of FIG. 4) may transmit an electronic message that includes the still image. As an example, when the endpoint 202 (see FIG. 2) is a transmitting endpoint, the endpoint 202 may transmit the video data via a first communications channel (e.g., via a connection protocol such as the transmission control protocol (TCP)), and may transmit the still image via a second communications channel (e.g., via electronic mail using a connectionless protocol such as the user datagram protocol (UDP)). As another example, when the endpoint 202 is part of a recording system 300 (see FIG. 3), the server 302 may send the snapshots (e.g., via email, instant messaging, etc.). As another example, when the endpoint 202 is a receiving endpoint, the endpoint 202 may send the snapshots (e.g., via email, instant messaging, etc.).

The snapshotting system (e.g., the snapshotting system 400 of FIG. 4) may transmit the snapshots as they are selected, or may send a group of snapshots (e.g., at the end of the videoconference or recorded presentation). For example, when each snapshot is sent as it is selected, the set of images (see 1008) includes the one selected image. As another example, when a group of snapshots are sent, the set of images (see 1008) includes the group of snapshots.

Additional Details

The following sections provide additional details and options regarding the snapshotting process.

Video Classifier

The snapshotting system (e.g., the snapshotting system 400 of FIG. 4, etc.) may implement a video classifier as part of its snapshot processing. For example, the video classifier may classify frames into those that show just the whiteboard and those that include a user in front of the whiteboard. The snapshotting system may then use only those frames that show just the whiteboard, as the presence of the user may block portions of the whiteboard. An example of identifying the presence of the user is described in U.S. Pat. No. 9,762,855.

Feedback System

The snapshotting system (e.g., the snapshotting system 400 of FIG. 4, etc.) may adjust its operation in response to feedback. For example, consider an implementation where the system 300 of FIG. 3 implements a videoconferencing system. The transmitting endpoint 202*a* associated with a first location may send the snapshots 404 to a second location (e.g., associated with the receiving endpoint 202*b*). Users at the second location may assess the snapshots 404, for example as part of viewing the video data. If the snapshots 404 are too frequent, the users may provide feedback to reduce the frequency of the snapshots 404. If the snapshots 404 are too infrequent, the users may provide feedback to increase the frequency of the snapshots 404. The transmitting endpoint 202*a* receives the feedback and adjusts the snapshotting system 400 accordingly.

In general, the feedback is used to adjust one or more thresholds used in calculating the difference measure. For example, for the identifier component 600 (see FIG. 6), the feedback adjusts the threshold used by the thresholding component 612. As another example, for the identifier component 700 (see FIG. 7), the feedback adjusts the intra-frame threshold 720. As another example, for the identifier component 502 operating according to the bit rate threshold as shown in FIG. 8, the feedback adjusts the threshold 804.

As an extension of the above example, users at multiple second locations (or associated with multiple receiving endpoints 202*b*, etc.) may provide feedback on the snapshots 404. The transmitting endpoint 202*a* receives the feedback, aggregates the feedback (from the multiple second locations, etc.), and adjusts the snapshotting system 400 accordingly. As a further extension, the snapshotting system 400 may adjust its thresholds according to one of the multiple locations whose feedback indicates the highest frequency adjustment; all of the snapshots 404 are sent to that location, and a pro-rata set of the snapshots 404 is sent to the other locations based on their individual feedback. For example, if the feedback from Locations X, Y and Z indicates respectively 4, 3 and 2 snapshots should be sent per minute, then the snapshotting system 400 may generate 4 snapshots; all 4 are sent to Location X, 3 of the 4 are selected and sent to Location Y, and 2 of the 4 are selected and sent to Location Z. In a similar manner, when the server 302 is performing the snapshotting instead of the transmitting endpoint 202*a*, the server 302 may receive the feedback (or aggregate the feedback from multiple receiving endpoints 202*b*) and, in accordance therewith, adjust the parameters of its snapshotting system 400.

Speech to Text Processing

The snapshotting system (e.g., the snapshotting system 400 of FIG. 4, etc.) may perform speech to text processing as part of generating the snapshots. For example, the endpoint 202 (see FIG. 2) may include a microphone, and may transmit audio data (with the video data transmitted by the system 300 of FIG. 3 as per the videoconferencing system) or may record the audio data (with the video data recorded by the system 300 of FIG. 3 as per the recording system).

The snapshotting system 400 performs speech to text processing on the audio data captured by the microphone to generate textual data. The snapshotting system 400 then associates a portion of the textual data with each still image (see 1006 in FIG. 10). For example, when the first snapshot is selected, the textual data from the beginning (of the videoconference, lecture, etc.) to the time of the first snapshot is associated with the first snapshot. Then when the second snapshot is selected, the textual data from after the first snapshot to the time of the second snapshot is associated with the second snapshot, etc.

The endpoint 202 may then distribute the snapshots with the associated textual data, for example as one or more briefing slides sent via email. For example, when there is one snapshot per briefing slide, that briefing slide also contains the textual data associated with that snapshot.

Similar functions may be performed by the server 302 (see FIG. 3) when the server 302 implements the snapshotting system 400.

As part of the speech to text processing, the snapshotting system 400 may implement a segment scheduler as described in U.S. Application Pub. No. 2018/0279063. For example, once the snapshotting system 400 has associated a snippet of audio with each video snapshot, the segment scheduler may arrange all the snippets of audio as one stream.

Combined Speech and Image Processing

The snapshotting system (e.g., the snapshotting system 400 of FIG. 4, etc.) may combine both speech processing and image processing to generate text as part of generating the snapshots. The snapshotting system 400 may perform speech to text processing on the audio data, may perform optical character recognition processing of the video data, and may perform a probabilistic combination of the results to generate the final textual data. The speech to text processing may be speech-to-lattice processing, speech-to-N-best-text processing, etc. in order to provide multiple hypotheses regarding the speech. The probabilistic combination may include the context determined from previous processing results.

II. Gesture Enrollment

The term "enrollment" may be used to refer to the process of designating a particular portion of captured video, for example as part of a videoconference. For example, as an alternative to displaying an entire image frame that contains a whiteboard, enrollment of the whiteboard allows the display to focus on the whiteboard for an improved viewer experience. Typical methods of enrollment include manual methods (e.g., using a touch screen interface), automatic methods (e.g., whiteboard detection using computer vision), etc.

The following discussion describes another method of enrollment, namely gesture enrollment. Gesture enrollment may provide a number of improvements over other enrollment methods. As compared to touch screen enrollment, gesture enrollment does not require touch screen hardware. As compared to whiteboard detection, gesture enrollment enables dynamic selection or adjustment of the region of interest during the videoconference. Furthermore, gesture enrollment provides robust detection of the region of interest under a variety of lighting conditions, a variety of wall-color-vs-whiteboard-color scenarios, etc. FIG. 11 shows a block diagram of an enrollment system 1100. The enrollment system 1100 may be implemented by a videoconferencing system, such as the videoconferencing system 100 (see FIG. 1), the videoconferencing system 200 (see FIG. 2), etc. For example, the videoconferencing endpoint 102 (see FIG. 1) or the videoconferencing endpoint 202 (see FIG. 2) may implement the enrollment system 1100. The enrollment system 1100 includes a gesture enrollment system 1102 and a transform system 1104.

The gesture enrollment system 1102 receives video data 1110, detects an enrollment gesture in the video data 1110, and generates a set of coordinates 1112. The video data 1110 generally corresponds to the video captured for the videoconference, for example by the camera 116, the camera 130 (see FIG. 1), the camera 230 (see FIG. 2), etc. The enrollment gesture generally corresponds to a gesture by a user that defines a portion of what is captured in the video data 1110. For example, the enrollment gesture may be the user's two hands forming "L" shapes with the thumb and index finger, defining two corners of an area of the whiteboard. This indicated area may be referred to as the region of interest. The set of coordinates 1112 then correspond to the locations of the two corner points of the region of interest in the frame of the video data 1110. The set of coordinates may correspond to a parallelogram or other regular shape.

The transform system 1104 receives the video data 1110 and the coordinates 1112, performs a geometric transform on the video data 1110 using the coordinates 1112, and generates transformed video data 1114. The whiteboard may be angled with respect to the camera, so the transform system 1104 may perform a de-skewing process, resulting in the transformed video data 1114 appearing as if the video data 1110 were captured more head-on. The region of interest is generally less than the entire (input) image frame, so the transform system 1104 may perform a zooming process, resulting in the transformed video data 1114 filling more of the (output) image frame.

The geometric transform may be a perspective transform. In general, the perspective transform alters the captured image frame to appear as if it were captured at another camera position. For example, the perspective transform may implement a homography that maps one plane to another plane (e.g., using a pinhole camera model). The geometric transform may be an affine transform. In general, the affine transform preserves parallel lines from the captured image frame to the transformed image frame.

The gesture enrollment system 1102 may initiate the enrollment process in response to a command. For example, the videoconferencing system may include a speech recognizer; when the user says, "Enroll this!" while making the enrollment gesture, the speech recognizer recognizes the command and instructs the gesture enrollment system 1102 to perform the enrollment process. As another example, the videoconferencing system may include a button or remote control that initiates the enrollment process. Alternatively, the gesture enrollment system 1102 may operate continuously.

FIG. 12A shows a perspective view showing an example frame of the video data (e.g., 1110 in FIG. 11) captured in a room 1200, e.g. by a camera or other videoconferencing system (not shown). The room 1200 includes a whiteboard 1202. A user 1204 is making an enrollment gesture to define a region of interest on the whiteboard 1202. (Note that the dotted lines defining the region of interest are only shown in FIG. 12A as a descriptive aid and are not actually present in the captured video data.) In this example, the enrollment gesture is the user's two hands in "L" shapes, defining two corners (the lower left and the upper right) of the region of interest. Note that the camera is offset to the left of the view, so the frame appears skewed (e.g., the left side of the whiteboard 1202 is closer to the camera and so appears larger than the right side; and the left side of the text in the region of interest appears larger than the right side). The enrollment system (e.g., 1100 in FIG. 11) receives the video data and generates the transformed video data (e.g., 1114 in FIG. 11).

FIG. 12B shows an example frame of the transformed video data (e.g., 1114 in FIG. 11) displayed on a monitor 1210. This example frame results from the enrollment system (e.g., 1100 in FIG. 11) performing the perspective transform on the video data (e.g., 1110 in FIG. 11), according to the defined region of interest. As compared to the frame shown in FIG. 12A, the frame shown in FIG. 12B has been de-skewed (e.g., the left side of the frame appears the same size as the right side of the frame) and zoomed (e.g., the region of interest generally fills the frame).

The user 1204 may control the videoconferencing system to toggle between views. For example, one view may correspond to the videoconferencing system transmitting the video data 1110 that corresponds to the view of FIG. 12A, generally showing a wide view that includes the user 1204 and the whiteboard 1202. Another view may correspond to the videoconferencing system transmitting the transformed video data 1114 that corresponds to the view of FIG. 12B, generally showing the region of interest (zoomed and de-skewed). (Again, note that the dotted lines defining the region of interest are only shown in FIG. 12B as a descriptive aid and are not actually present in the displayed video data). The user may toggle between views using a button on the videoconferencing system, a remote control, a voice command, etc. A user other than the user 1204 (e.g., a user at the other end of the videoconference) may also toggle the views. The settings for each view (e.g., multiple previous enrollment areas, etc.) may be stored in the memory of the videoconferencing system and selected by the users.

FIG. 13 shows a block diagram of a gesture enrollment system 1300. The gesture enrollment system 1300 may be used as the gesture enrollment system 1102 (see FIG. 11). The gesture enrollment system 1300 may be implemented by a videoconferencing system, such as the videoconferencing system 100 (see FIG. 1), the videoconferencing system 200 (see FIG. 2), etc. For example, the videoconferencing endpoint 102 (see FIG. 1) or the videoconferencing endpoint 202 (see FIG. 2) may implement the gesture enrollment system 1300. The gesture enrollment system 1300 includes a classifier 1302, an orientation verifier 1304, and a coordinate generator 1306. The gesture enrollment system 1300 interacts with a model 1317. The model 1317 may be stored in the memory of the computer system that implements the gesture enrollment system 1300. The gesture enrollment system 1300 uses the model 1317 as part of the classification process, as described in more detail below. A training component 1318 may be used to generate the model 1317 using an image set 1310. The training component 1318 may be implemented by the computer system that implements the gesture enrollment system 1300.

The image set 1310 generally corresponds to a plurality of images that each include a user making the defined enrollment gesture, a number of images of hands making the enrollment gesture, etc. The image set 1310 may include images of a single hand making the enrollment gesture (e.g., the "L" shape being made by left hands with the palm showing, by right hands with the palm showing, by left hands with the back of the hand showing, by right hands with the back of the back of the hand showing, etc.). The image set 1310 may include images of two hands making the enrollment gesture (e.g., the "L" shape being made by both left and right hands with the palms showing, by both left and right hands with the backs of the hands showing, by both left and right hands with one showing the palm and the other showing the back of the hand, etc.).

The image set 1310 may include a number of images of different hands (e.g., 1000, 2000, 3000, 4000 photos, etc.). The images may include a variety of hand sizes (e.g., large, small, medium), nail configurations (e.g., short nails, long nails, painted, unpainted), hair coverages (e.g., hairy hands, smooth hands), skin tones (e.g., pale, dark, various other shades), clothing styles (e.g., long sleeves, short sleeves), finger accoutrements (e.g., rings, no rings), wrist accoutrements (e.g., watches, no watches), etc. The images may be of a variety of sizes, with a minimum size of around 16×16 pixels. The images may be grayscale images, color images, etc.

The image set 1310 may include images with identifiable items. For example, a specific style of ring may be used when performing the gesture enrollment, and the image set 1310 may include images that also include that specific style of ring. As another example, the videoconferencing system may interact with a smartwatch to display a specific image, and the image set 1310 may include images that also include wrists wearing a smartwatch displaying that specific image, or just that specific image in a variety of angles.

The image set 1310 may include images that cover a variety of ranges for the field of view and lighting conditions that are representative of those that would result from the use of the system. Example lighting conditions include natural lighting (e.g., near a window, with or without sunlight streaming in, with or without shadows), artificial lighting (e.g., fluorescent office lighting), etc. One way to collect the dataset of images is to configure a number of rooms (e.g., 10-20 rooms) with different whiteboards and to photograph a variety of people (e.g., 100 people) wearing a variety of props. For example, the set of people can include a variety of genders, a variety of skin tones, a variety of heights, etc. The props may include rings, bracelets, watches, fake nails, jackets, short sleeves, etc. The lighting conditions may be varied in each room, and each person may perform the enrollment gesture wearing numerous prop combinations and may be photographed using various fields of view.

The images in the image set 1310 may have their contrast normalized. (The video data 1110 may also have its contrast normalized.) The contrast normalization may be similar to that performed by the equalization component 3304 (see FIG. 33) discussed below. Images for the training set may be created programmatically, by creating different distributions of brightness and applying those distributions to the original image set.

The classifier 1302 receives the video data 1110 (see FIG. 11), performs classification on the video data 1110 using the model 1317, and generates a set of coordinates 1312. The set of coordinates 1312 generally corresponds to the locations of the identified enrollment gestures in the video data 1110.

The classifier 1302 may perform classification using one or more of a variety of classification processes including heuristic classification, machine learning classification, etc. to classify the video data 1110. For example, the classifier 1302 may implement an adaptive boosting process, a Haar-like feature classifier, a convolutional neural network, a deep learning network, a recurrent neural network, etc. For example, the classifier 1302 may implement a convolutional neural network such as the AlexNet convolutional neural network. The specific configuration of the classifier 1302 may be adjusted to account for the type of images in the image set 1310 or the specific model 1317.

When the image set 1310 used to generate the model 1317 includes images of a single hand, the classifier 1302 identifies the left hand making the enrollment gesture and determines a set of coordinates for the left hand, and identifies the right hand making the enrollment gesture and determines a set of coordinates for the right hand. For example, the set of coordinates 1312 may correspond to the coordinates where the thumb and index finger intersect, for each identified hand making the enrollment gesture.

When the image set 1310 used to generate the model 1317 includes images of two hands, the classifier 1302 identifies the two hands making the enrollment gesture, determines a set of coordinates for one of the hands, and determines a set of coordinates for the other hand. The set of coordinates 1312 then corresponds to two points in a frame of the video data 1110, corresponding to the two locations of the user's hands making the enrollment gesture.

The orientation verifier 1304 generally verifies that the set of coordinates 1312 correspond to the locations of the two hands and the orientations of the index finger and thumb of each. In general, the orientation verifier 1304 verifies the enrollment process if both of the following conditions are true. The first condition is that the set of coordinates 1312 correspond to two instances of hands in the "L" shape, e.g. one right hand and one left hand from the same person. The second condition is that the respective index fingers and thumbs of the hands describe a parallelogram. (This avoids enrollment when the two hands are pointing in the same direction.)

To perform the verification, the orientation verifier 1304 determines whether the vectors described by the index fingers and thumbs of each hand define a plausible parallelogram. Determining whether a parallelogram is plausible may, for example, entail checking one or more of the following conditions. One condition is that the two thumbs point in opposing (or perpendicular) directions (for example, as indicated by the dot product of the two thumb vectors being negative). Another condition is that the two index fingers point in opposing (or perpendicular) directions (for example, as indicated by the dot product of the two index finger vectors being negative). Another condition is that the aspect ratio of the axis-aligned bounding box around the two hand locations lies within a certain range (for example, within the range 0.5-2.0).

If the orientation verifier 1304 successfully verifies the coordinates, they are provided (as the set of coordinates 1314) to the coordinate generator 1306; otherwise the process of enrollment terminates.

The coordinate generator 1306 generates a set of coordinates 1316 that correspond to a quadrilateral (e.g., four points) that includes the set of coordinates 1314. (The quadrilateral may be a trapezoid or trapezium depending on the plane on the surface versus the plane of the camera or transformation.) The coordinate generator 1306 identifies a horizontal or vertical line in the video data 1110 and uses that line to extend the coordinates 1314 (two points) to the coordinates 1316 (four points). (Note that due to camera angles, the horizontal and vertical lines may not appear to be strictly horizontal and vertical in the video data 1110.) The coordinate generator 1306 may identify a vertical line by identifying the side of the whiteboard, the intersection of two walls, etc.; or a horizontal line by identifying the top or bottom of the whiteboard, the intersection of a wall and the ceiling, etc. For example, when the side of the whiteboard has been identified as a vertical line, the coordinate generator 1306 may extend a parallel vertical line from one of the coordinates 1314, and may extend a perpendicular line from that parallel vertical line to intersect the other of the coordinates 1314; the intersection of those two lines is then one of the coordinates 1316.

One way for the coordinate generator 1306 to identify horizontal or vertical lines is as follows. First, the coordinate generator 1306 performs thresholding on the image (e.g., a frame of the video data 1110). Second, the coordinate generator 1306 identifies the contours (e.g., the boundary of the set of points that are connected) in the thresholded image. Third, the coordinate generator 1306 identifies points on the contours having the same (within a range) x or y coordinates within a frame; the corresponding contours are (respectively) horizontal or vertical lines. If the contours are neither vertical nor horizontal, the coordinate generator 1306 may calculate a minimum bounding box and then fit the contours to the shape, since two points in the minimum bounding box will lie on the bounding box itself. Alternatively, the coordinate generator 1306 may use a contour approximation method when the contours are in a simple shape.

The coordinate generator 1306 may implement a lens correction transform as part of generating the coordinates 1316. The lens correction transform may be performed on the video data 1110, on the image set 1310, etc. The lens correction transform is useful when the lens of the video camera is a wide angle lens, such as a fisheye lens, etc. In such a case, in the absence of lens correction, the affine transform would distort text or writing in the image, so the lens correction in combination with the affine transform preserves the text.

The gesture enrollment system 1300 may then provide the coordinates 1316 to the transform system 1104 as the coordinates 1112 (see FIG. 11).

Figure 14:
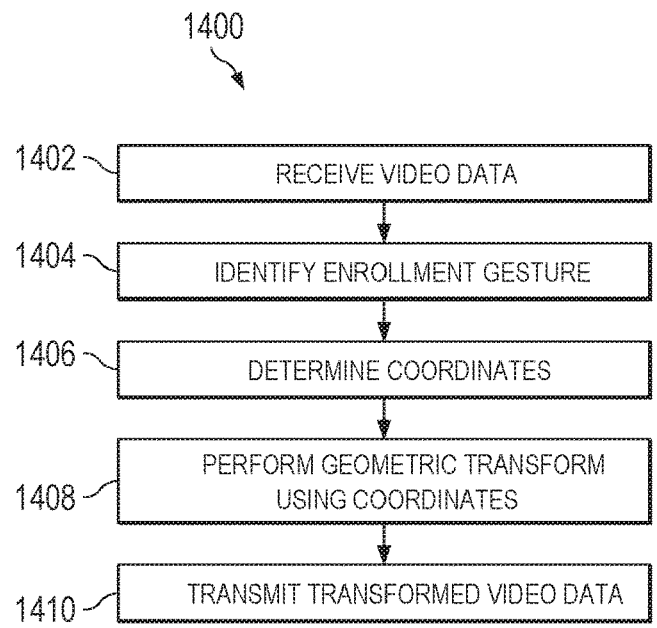
FIG. 14 is a flow diagram of a method 1400 of enrolling a writing surface captured on video.

FIG. 14 is a flow diagram of a method 1400 of enrolling a writing surface captured on video. The writing surface may be a whiteboard, such as the whiteboard 1202 (see FIG. 12). The method 1400 may be performed by a videoconferencing system, such as the videoconferencing system 100 (see FIG. 1), the videoconferencing system 200 (see FIG. 2), etc. For example, the videoconferencing endpoint 102 (see FIG. 1) or the videoconferencing endpoint 202 (see FIG. 2) may implement a computer program that controls the endpoint to perform the method 1400. As another example, the videoconferencing endpoint 102 may implement the gesture enrollment system 1100 (see FIG. 11) that performs the method 1400. At 1402, video data is received. The video data captures a physical writing surface. For example, the video camera 230 (see FIG. 2) may capture the video data 1110 (see FIG. 11) of the whiteboard 232 (see FIG. 2), which is received by the gesture enrollment system 1100 (see FIG. 11).

At 1404, an enrollment gesture by a user in the video data is identified. The enrollment gesture is associated with an area of the physical writing surface. For example, the enrollment gesture may be the user's hands in two "L" shapes that define two corners of a region of interest of the whiteboard. The gesture enrollment system 1102 (see FIG. 11) or the gesture enrollment system 1300 (see FIG. 13) may identify the enrollment gesture, e.g. using machine learning.

At 1406, a set of coordinates corresponding to the enrollment gesture is determined in the video data. The set of coordinates is associated with the area of the physical writing surface identified by the enrollment gesture. For example, the coordinates 1112 (see FIG. 11) or the coordinates 1316 (see FIG. 13) may correspond to the region of interest associated with the enrollment gesture (see 1404). The gesture enrollment system 1102 (see FIG. 11) or the gesture enrollment system 1300 (see FIG. 13) may determine the coordinates.

At 1408, a geometric transform is performed on the video data using the set of coordinates to generate transformed video data that corresponds to the area identified by the enrollment gesture. The geometric transform may result in de-skewing, zooming, etc. of the video data. The geometric transform may include a perspective transform, an affine transform, etc. The transform system 1104 may perform the geometric transform on the video data 1110 using the coordinates 1112 to generate the transformed video data 1114 (see FIG. 11).

At 1410, the transformed video data is transmitted. For example, the videoconferencing system 100 (see FIG. 1) or the videoconferencing system 200 (see FIG. 2) may transmit the transformed video data 1114 (see FIG. 11) as part of a videoconference. The transformed video data may then be received and displayed by other devices participating in the videoconference.

The method 1400 may be performed again to identify another region of interest. For example, the steps 1404-1408 may be performed to determine the coordinates for a first region of interest; then the user may perform gesture enrollment a second time, and the steps 1404-1408 may be performed to determine the coordinates for the second region of interest.

III. Sharing a Writing Surface

In cases where the user is participating in a videoconference using their laptop camera or webcam, such devices are generally well suited for capturing a headshot or upper body shot of the user. However, such devices are generally not well suited for capturing related content, such as the user's contemporaneous handwriting. Described herein are techniques for sharing a writing surface, such as a piece of paper, using the user's laptop camera or webcam. The techniques are also applicable when using a high-resolution camera (e.g., a video camera of a videoconferencing system in a conference room) that performs the capture on a piece of paper located at any position in the conference room that is within the camera frame.

An example use case is as follows. The user is participating in a videoconference from home using their laptop. The user wishes to share their markings (e.g., writings, drawings, sketches, etc.), so they verify that a piece of paper is in the camera frame and write on the paper. The system identifies the paper and processes the captured images for transmission, contemporaneously with the writing. This provides an improved interactive experience as compared to writing on a piece of paper on a desk, pausing to hold up the piece of paper to the camera, and repeating this process with each successive writing.

Figure 15:
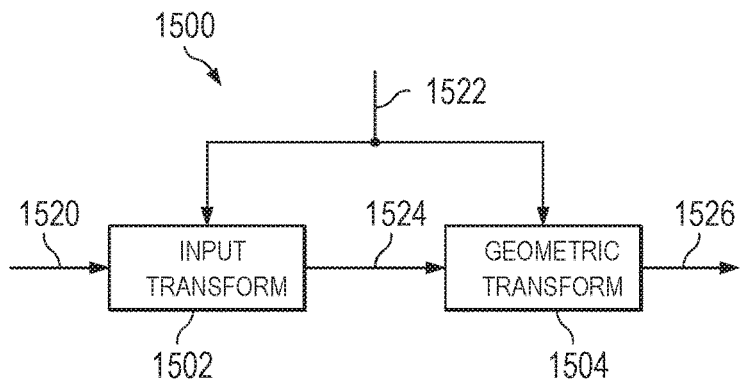
FIG. 15 is a block diagram of a system 1500 for sharing a writing surface captured on video.

FIG. 15 is a block diagram of a system 1500 for sharing a writing surface captured on video. The system 1500 may be implemented by a laptop computer that also implements other components of a videoconferencing system (e.g., 100 in FIG. 1. 200 in FIG. 2, etc.). For example, the laptop may implement one or more of the videoconferencing endpoint 102 or 202, the computing apparatus 120, the camera 116 or 130 or 230, etc. The laptop may implement the system 1500 by executing one or more computer programs, for example as part of a more generalized computer program that controls the laptop to perform a videoconferencing function. A mobile telephone or other computing devices may be used in a similar manner to the laptop. The system 1500 includes an input transform component 1502 and a geometric transform component 1504.

The input transform component 1502 receives input video data 1520 and corner information 1522, performs a transform operation on the input video data 1520 using the corner information 1522, and generates transformed video data 1524. The input video data 1520 generally corresponds to the video captured by the camera of the laptop (e.g., the video data 402 of FIG. 4, the video data 1110 of FIG. 11, etc.). The input transform component 1502 may perform transforms such as lens correction, frame size adjustment, resizing, dewarping, upscaling, etc. The input transform component 1502 may use the corner information 1522 to perform resolution resizing or upscaling of the input video data 1520, so that the transformed video data 1524 more closely corresponds to the paper (as defined by its corners).

The geometric transform component 1504 receives the transformed video data 1524 and the corner information 1522, performs a geometric transform on the transformed video data 1524 using the corner information 1522, and generates transformed video data 1526. In general, the geometric transform component 1504 may perform transforms to flip the captured image (so that it appears right-side up to the viewer), to de-skew the captured image (since the captured page may appear as a trapezoid or trapezium), etc. See FIG. 21 for an example of the results of the geometric transform process.

(Note that the terms "trapezoid" and "trapezium" refer to a convex quadrilateral with at least one pair of parallel sides, with "trapezoid" favored in American English and "trapezium" favored in British English. This document uses the terms interchangeably.)

Performing the input transform (e.g., upscaling) by the input transform component 1502 prior to the geometric transform by the geometric transform component 1504 enables the system 1500 to maintain the approximate aspect ratio of the writing, which helps with readability. As part of this process, it is recommended that the geometric transform component 1504 performs the geometric transform on a bounded box. (This recommendation is not essential.) In addition, because the geometric transform is essentially linear, it can result in jagged edges if a linear interpolation is performed as part of the geometric transform. To avoid this situation, the input transform by the input transform component 1502 is performed prior to the geometric transform by the geometric transform component 1504.

As a further option, the geometric transform component 1504 may not preserve the aspect ratio, but may instead use a different aspect ratio. (Using a different aspect ratio may be beneficial in certain circumstances, for example when the captured handwriting is poorly written.) One example aspect ratio is the golden ratio $\varphi$ (e.g., approximately 1.62).

The system 1500 may implement a face detection process in order to automatically toggle between a normal mode (e.g., a videoconferencing mode) and a paper sharing mode (e.g., sharing a paper or other writing surface). When the system 1500 detects a face in the video frame, the system 1500 controls the laptop to process the input video data 1520 as per the normal videoconferencing process (e.g., bypassing the input transform component 1502 and the geometric transform component 1504). When the system 1500 detects a face in the video frame, the system 1500 processes the input video data 1520 using the input transform component 1502 and the geometric transform component 1504 as described above.

The system 1500 may implement a Haar cascade to perform the face detection process. The system 1500 may further interact with a hinge sensor of the laptop as part of the face detection process. When the hinge sensor reports that the laptop screen is directed level or upward, this increases the likelihood that the system 1500 enters normal mode, and when the hinge sensor reports that the laptop screen is directed downward, this increases the likelihood that the system 1500 enters paper sharing mode. For example, the system 1500 may lower the detection threshold of the face detector when the laptop screen is directed upward. Alternatively, the system 1500 may use the hinge sensor output in place of the Haar cascade (or other face detection process).

Figure 16:
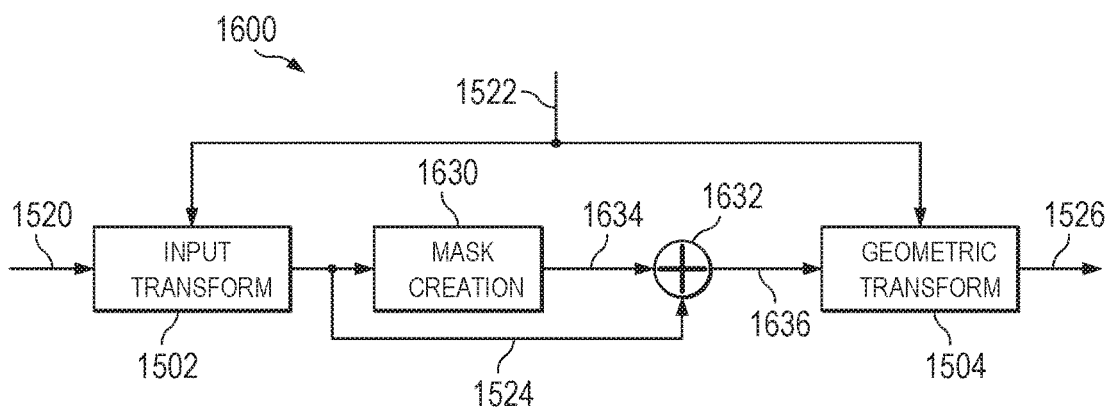
FIG. 16 is a block diagram of a system 1600 for sharing a writing surface captured on video.

FIG. 16 is a block diagram of a system 1600 for sharing a writing surface captured on video. The system 1600 is similar to the system 1500 (see FIG. 15), with the addition of a mask creation component 1630 and an adder 1632.

The mask creation component 1630 receives the transformed video data 1524 and generates a mask 1634 based on the transformed video data 1524. The mask 1634 generally corresponds to identifying dark writing on a light background, such as would be present with writing on a piece of paper. The mask creation component 1630 may perform adaptive thresholding, filtering, etc. to generate the mask 1634. The mask creation component 1630 may operate on grayscale images. Alternatively, the mask creation component 1630 may operate on green pixel data, as green can be an alternative to grayscale due to the geometry of the charge-coupled devices (CCDs) in the camera.

The adder 1632 receives the transformed video data 1524 and the mask 1634, applies the mask 1634 to the transformed video data 1524, and generates combined video data 1636. As compared to the transformed video data 1524, the writing on the page captured in the combined video data 1636 is enhanced.

The geometric transform component 1504 otherwise operates as described with reference to FIG. 15, except that it performs the geometric transform on the combined video data 1636 to generate the transformed video data 1526.

Figure 17:
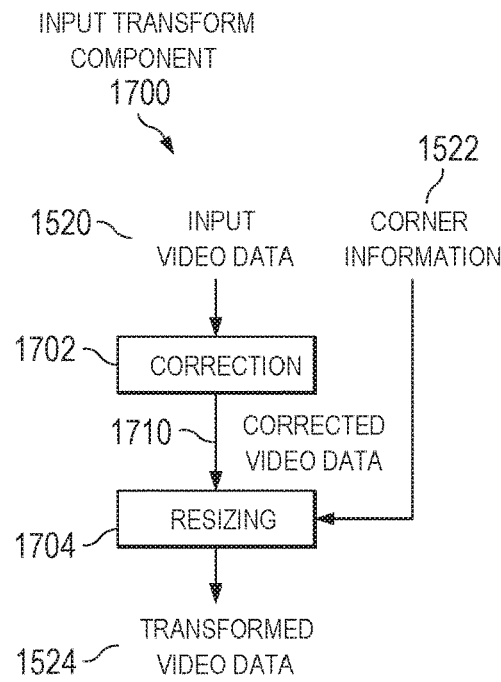
FIG. 17 is a block diagram of an input transform component 1700.

FIG. 17 is a block diagram of an input transform component 1700. The input transform component 1700 may be used as the input transform component 1502 (see FIG. 15, FIG. 16, etc.). The input transform component 1700 includes a correction component 1702 and a resizing component 1704.

The correction component 1702 receives the input video data 1520 (see FIG. 15), performs a distortion correction transform on the input video data 1520, and generates corrected video data 1710. For example, the camera on the laptop may have a fisheye lens, resulting in the input video data 1520 having fisheye distortion (e.g., the lens distorts straight lines and they appear as curved); the distortion correction component 1702 applies a transform to correct for the fisheye distortion.

The correction component 1702 may also implement other corrections to correct for other types of distortions, such as those resulting from other types of wide angle lenses. The correction component 1702 may also implement corrections for mirrors (both curved mirrors and flat mirrors). A lens system may include both lenses and mirrors, which the correction component 1702 corrects. A mirror may be a conventional mirror or a one way mirror (also known as a beam splitter). The lens system may include an attachable lens system, such as a wide angle lens that is clipped over an existing laptop camera to provide a wider field of view.

The correction component 1702 may implement a correction stage that splits the input image into two fractions. The lower fraction will include the page, and the upper fraction will include the user's face. The two images (one of the page, the other of the face) may then be displayed separately as two different feeds within the video conferencing system output (where both feeds are corrected).

The correction component 1702 may implement a decomposition of a paper image and a user's face image when they appear in the same image. To implement the decomposition, the correction component 1702 may use a frequency-dependent color filter. For example, the system may include a hardware one-way mirror that may be frequency dependent. This one-way mirror may be attachably removable from the lens system, e.g. using a clip. As a result of this one-way mirror, two separate images are merged before they arrive at the camera lens, and then the correction component 1702 filters the merged image to recover the face and the page as two separate images.

The resizing component 1704 receives the corrected video data 1710 and the corner information 1522, performs resizing on the corrected video data 1710 using the corner information 1522, and generates the transformed video data 1524 (see also FIG. 15). The resizing component 1704 may perform resolution resizing, upscaling, etc. The resizing component 1704 may perform bilinear interpolation or bicubic interpolation using a bounded quadrilateral to preserve the aspect ratio of the corrected video data 1710 when generating the transformed video data 1524. For example, instead of the transformed video data 1524 including the entire frame of the corrected video data 1710 (e.g., including areas outside of the corners of the paper), the transformed video data 1524 is resized so that its frame corresponds to the paper. An example of the bilinear interpolation process that the resizing component 1704 may implement is to take the average between two adjacent points on one axis and then taking the average of the two interpolated points along the other axis. Alternatively, the resizing component 1704 may implement nearest neighbor interpolation. As an alternative to the bounded quadrilateral (or other bounding box), the resizing component 1704 may adjust the aspect ratio (instead of preserving the aspect ratio). For example, the resizing component 1704 may adjust the aspect ratio to conform to the golden ratio, or to another desired aspect ratio.

Figure 18:
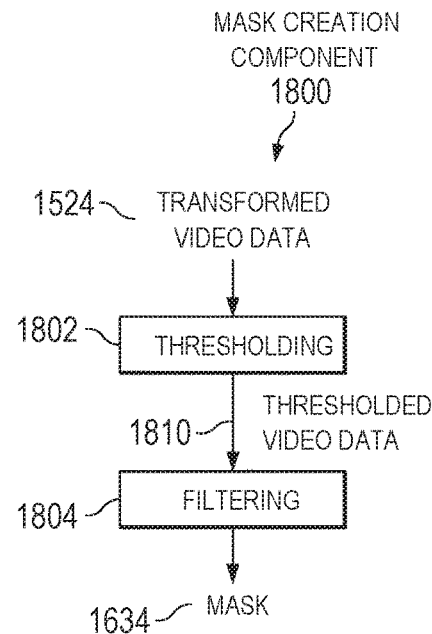
FIG. 18 is a block diagram of a mask creation component 1800.

FIG. 18 is a block diagram of a mask creation component 1800. The mask creation component 1800 may be used as the mask creation component 1630 (see FIG. 16). The mask creation component 1800 includes a thresholding component 1802 and a filtering component 1804.

The thresholding component 1802 receives the transformed video data 1524 (see also FIG. 16), performs thresholding on the transformed video data 1524, and generates thresholded video data 1810. In general, the thresholding identifies the mask of dark writing on a white background, as would be present when writing on a piece of paper. The thresholding component 1802 may implement adaptive thresholding, in which the threshold value at each pixel location depends on the neighboring pixel intensities. In this manner, the adaptive thresholding takes into account spatial variations in illumination. Adaptive thresholding typically takes a grayscale or color image as input and, in the simplest implementation, outputs a binary image representing the segmentation. For each pixel in the image, a threshold is calculated. If the pixel value is below the threshold it is set to the background value, otherwise it assumes the foreground value. The thresholding component 1802 may perform adaptive thresholding using a 5×5 region with mean thresholding; a larger region may be used as the resolution of the image increases.

The filtering component 1804 receives the thresholded video data 1810, performs filtering on the thresholded video data 1810, and generates the mask 1634 (see also FIG. 16). In general, the thresholding process may introduce noise, so the filtering operates to remove the noise from the mask 1624. The filtering component 1804 may perform temporal filtering, for example by averaging successive frames of the thresholded video data 1810. For example, the filtering component 1804 may implement a finite impulse response filter. The filtering component 1804 may implement a boxcar filter with an equally weighted average of the image frames (e.g., 5 frames).

Figure 19:
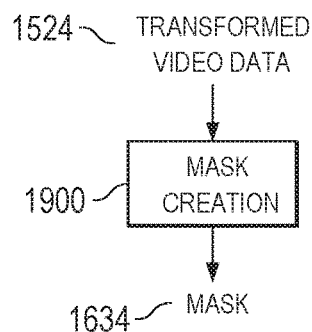
FIG. 19 is a block diagram of a mask creation component 1900.

FIG. 19 is a block diagram of a mask creation component 1900. The mask creation component 1900 may be used as the mask creation component 1630 (see FIG. 16). The mask creation component 1900 receives the transformed video data 1524 (see also FIG. 16), performs thresholding on the transformed video data 1524, and generates the mask 1624. The mask creation component 1900 may implement adaptive thresholding with filtered thresholds. The filtered thresholds may be computed temporally. For example, the mean or weighted sum calculation to determine the adaptive threshold of a given block may consider previous given blocks.

Figure 20:
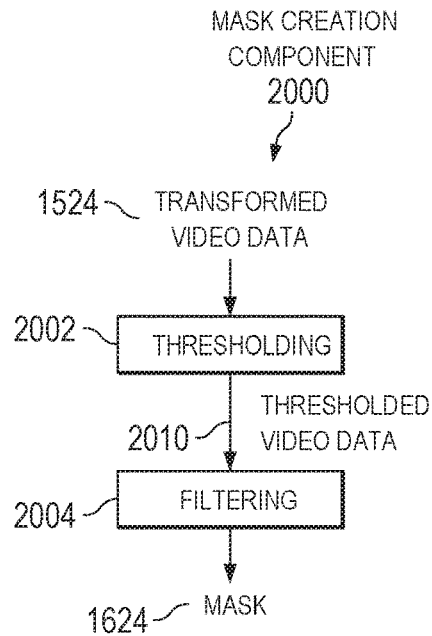
FIG. 20 is a block diagram of a mask creation component 2000.

FIG. 20 is a block diagram of a mask creation component 2000. The mask creation component 2000 may be used as the mask creation component 1630 (see FIG. 16). The mask creation component 2000 includes a thresholding component 2002 and a filtering component 2004.

The thresholding component 2002 receives the transformed video data 1524 (see also FIG. 16), performs thresholding on the transformed video data 1524, and generates thresholded video data 2010. The thresholding component 2002 may be otherwise similar to the thresholding component 1802 (see FIG. 18).

The filtering component 2004 receives the thresholded video data 2010, performs filtering on the thresholded video data 2010, and generates the mask 1624 (see also FIG. 16). The filtering component 2004 may perform spatial filtering, which adjusts the intensity of a given pixel according to the intensities of the neighboring pixels. The filtering component 2004 may perform mathematical morphology, for example by performing successive erosion and dilation stages on a thresholded binary image in order to remove noise.

Figure 21A:
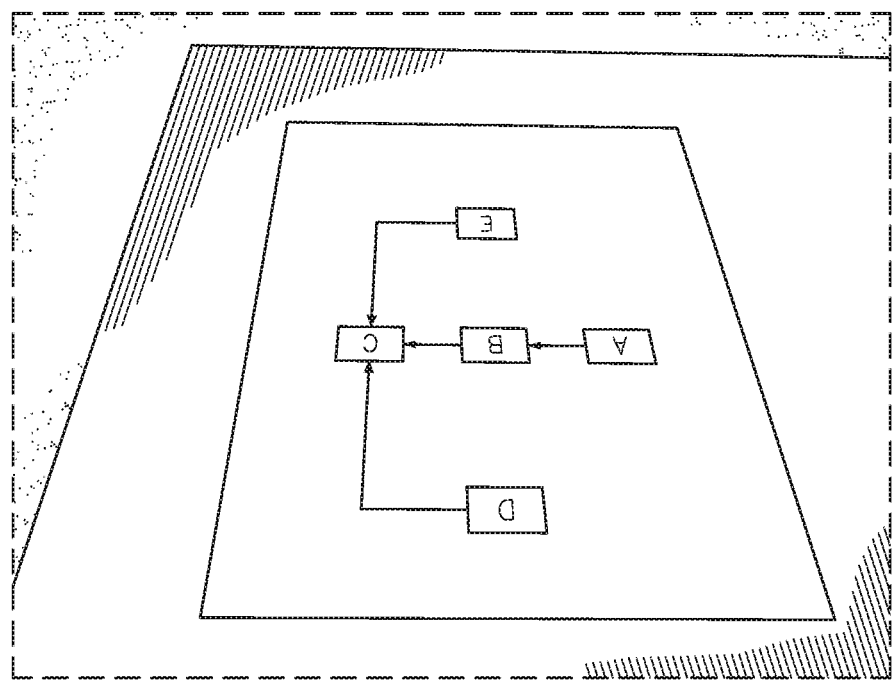
FIG. 21A illustrates a frame of the input video data 1520.

FIGS. 21A-21D illustrate the results of various transforms performed by the system 1500 (see FIG. 15), the system 1600 (see FIG. 16), etc. FIG. 21A illustrates a frame of the input video data 1520, showing a page of paper on a table top; the floor can be seen to the left and at the far edge of the table. Imagine that the frame shown in FIG. 21A was captured by a laptop on the table, with the screen and camera of the laptop angled downward to capture the page (instead of upward to capture the user for videoconferencing). Note how the page appears flipped, how the near edge ("top"), from a flipped perspective) of the paper appears larger than the far edge ("bottom"), and how the "vertical" lines on the paper appear parallel with the sides of the paper (and so do not actually appear to be vertical given that the near edge appears larger than the far edge).

Figure 21B:
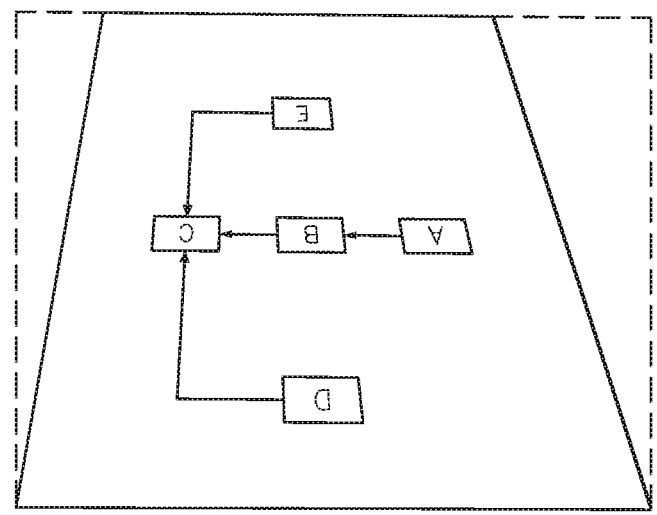
FIG. 21B illustrates the cropped frame resulting from cropping the input video data 1520.

FIG. 21B illustrates the cropped frame resulting from cropping the input video data 1520 according to the corner information 1522 (see FIG. 15) and zooming to fill the frame. The frame shown in FIG. 21B may correspond to a frame of the transformed video data 1524 generated by the input transform component 1502 by applying an upscaling transform. The cropping preserves the aspect ratio, so the frame includes portions of the table where the page appears smaller at the far edge ("bottom").

Figure 21C:
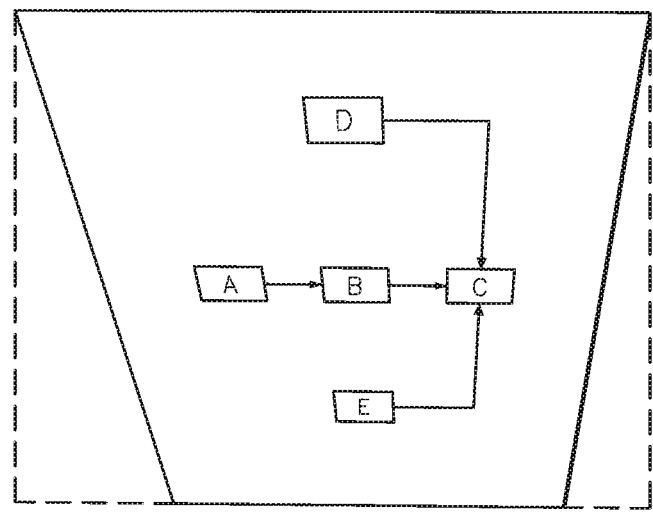
FIG. 21C illustrates the flipped frame resulting from flipping the transformed video data 1524 (see FIG. 15).

FIG. 21C illustrates the flipped frame resulting from flipping the transformed video data 1524 (see FIG. 15). The frame shown in FIG. 21C may correspond to a frame of the transformed video data 1526 generated by the geometric transform component 1504 by applying a vertical flipping transform.

Figure 21D:
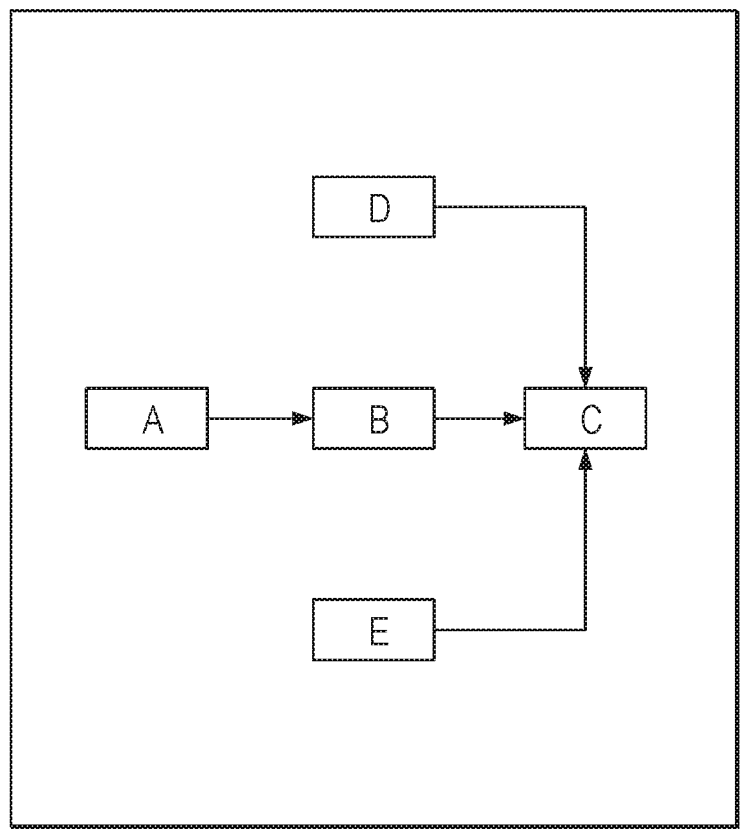
FIG. 21D illustrates the output frame resulting from applying a geometric transform to the transformed video data 1524 (see FIG. 15).

FIG. 21D illustrates the output frame resulting from applying a geometric transform to the transformed video data 1524 (see FIG. 15). The frame shown in FIG. 21D may correspond to a frame of the transformed video data 1526 generated by the geometric transform component 1504 by applying a perspective transform. Note how the page appears rectangular (instead of the trapezoid of FIG. 21A) and how the "vertical" lines now appear actually vertical.

Figure 22:
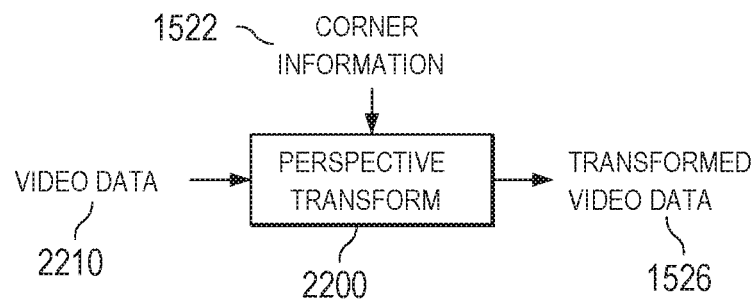
FIG. 22 is a block diagram of a perspective transform component 2200.

FIG. 22 is a block diagram of a perspective transform component 2200. The perspective transform component 2200 may be used as the geometric transform component 1504 (see FIG. 15, FIG. 16, etc.). The perspective transform component 2200 receives video data 2210 and the corner information 1522 (see FIG. 15, FIG. 16, etc.), performs a perspective transform on the video data 2210 using the corner information 1522, and generates the transformed video data 1526. The video data 2210 may correspond to the transformed video data 1524 (see FIG. 15), the combined video data 1636 (see FIG. 16), etc. The perspective transform generally maps the video data 2210 to the transformed video data 1526, such that the corners of a frame of the video data 2210 (as provided by the corner information 1522) map to the corners of a frame of the transformed video data 1526. For example, the camera may capture the video data 2210 at an offset perspective from the page (e.g., nearer to one edge of the page than to another); in such a case, the near part of the page appears larger than the far part in the video data 2210, and the perspective transform component 2200 applies the perspective transform to correct this.

The perspective transform component 2200 may implement a homography matrix to generate the transformed video data 2210. In general, the homography matrix M is a 3×3 matrix that, when applied to the video data 2210, maps every pixel to a corresponding pixel in the transformed video data 2210. The 9 parameters of the homography matrix M may be calculated by inputting the 4 points that make up the original plane (referred to as X) and the desired 4 output points (referred to as Y) and calculating M as $X^{-1}Y$.

Figure 23:
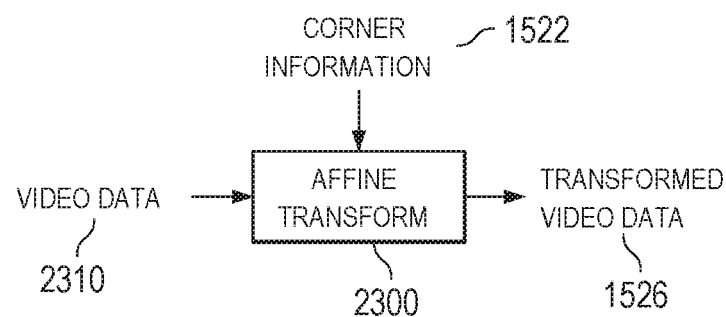
FIG. 23 is a block diagram of an affine transform component 2300.

FIG. 23 is a block diagram of an affine transform component 2300. The affine transform component 2300 may be used as the geometric transform component 1504 (see FIG. 15, FIG. 16, etc.). The affine transform component 2300 receives video data 2310 and the corner information 1522 (see FIG. 15, FIG. 16, etc.), performs an affine transform on the video data 2310 using the corner information 1522, and generates the transformed video data 1526. The video data 2310 may correspond to the transformed video data 1524 (see FIG. 15), the combined video data 1636 (see FIG. 16), etc. The affine transform generally maps the video data 2310 to the transformed video data 1526, such that the corners of a frame of the video data 2310 (as provided by the corner information 1522) map to the corners of a frame of the transformed video data 1526, and that parallel lines in the video data 2310 remain parallel in the transformed video data 1526.

The affine transform component 2300 may implement an affine homography matrix to generate the transformed video data 1526. In general, the affine homography matrix A is a 3×3 matrix having a bottom row 0,0, 1. When the affine homography matrix A is applied to the video data 2310, it maps every pixel to a corresponding pixel in the transformed video data 1526. The 6 parameters of the affine homography matrix A may be calculated by inputting the 3 points that make up the original plane (referred to as X) and the desired 3 output points (referred to as Y) and calculating M as $X^{-1}Y$.

Figure 24:
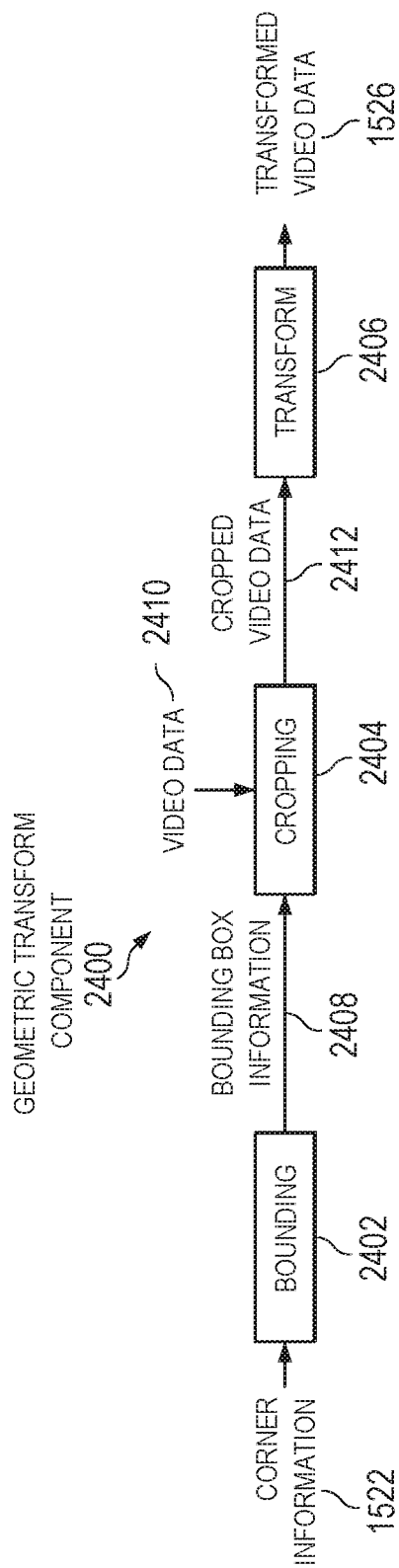
FIG. 24 is a block diagram of a geometric transform component 2400.

FIG. 24 is a block diagram of a geometric transform component 2400. The geometric transform component 2400 may be used as the geometric transform component 1504 (see FIG. 15, FIG. 16, etc.). The geometric transform component 2400 includes a bounding component 2402, a cropping component 2404 and a transform component 2406.

The bounding component 2402 receives the corner information 1522 (see FIG. 15) and calculates bounding box information 2408. The bounding box information 2408 corresponds to a bounding box around the corners of the page that preserves the aspect ratio for transforming the video data onto the output frame. (The bounding box is a bounded rectangle and thus has four right angles, whereas the corner information 1522 does not require the angles between the points to be right angles.)

The cropping component 2404 receives the bounding box information 2408 and video data 2410, crops the video data 2410 according to the bounding box information 2408, and generates cropped video data 2412. The video data 2410 may correspond to the transformed video data 1524 (see FIG. 15), the combined video data 1636 (see FIG. 16), etc.

The transform component 2406 receives the cropped video data 2412, performs a geometric transform on the video data 2412, and generates the transformed video data 1526 (see FIG. 15, FIG. 16, etc.). Performing the geometric transform using the bounding box information 2408 and the cropped video data 2412 (instead of using the corner information 1522) may result in an improved result, since the geometric transform scaling may result in jagged edges when using the corner information. For example, jagged edges may result when the interpolation that occurs due to the perspective transform is uneven in its two dimensions. By maintaining the aspect ratio using the bounding box information 2408, this is reduced. As another alternative, the system may use non-linear interpolation to reduce the appearance of jagged edges.

Figure 25:
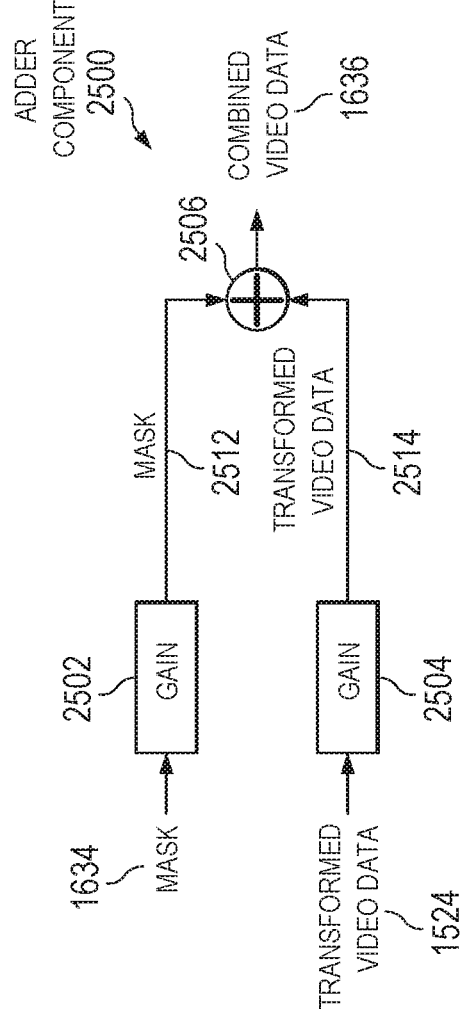
FIG. 25 is a block diagram of an adder component 2500.

FIG. 25 is a block diagram of an adder component 2500. The adder component 2500 may be used as the adder 1632 (see FIG. 16). The adder component 2500 includes a gain component 2502, a gain component 2504, and an adder 2506.

The gain component 2502 receives the mask 1634 (see FIG. 16), applies a gain to the pixels of the mask 1634, and generates a mask 2512. A suitable gain that provides reasonable results may be between 0.30 and 0.40 (e.g., 0.35).

The gain component 2504 receives the transformed video data 1524 (see FIG. 16), applies a gain to the pixels of the transformed video data 1524, and generates transformed video data 2514. A suitable gain that provides reasonable results may be between 0.70 and 0.80 (e.g., 0.75).

Applying the gain prior to combining the mask 1634 and the transformed video data 1524 functions to "mix" the images in a manner similar to mixing audio, with the amount of mixing depending upon the gain values selected. For the example gains of 0.75 and 0.35 discussed above, this enables the colors to be maintained since mixing the average mask could result in the colors being washed out or saturated. (The gains applied by the gain components 2502 and 2504 may also be negative.)

The adder 2506 receives the mask 2512 and the transformed video data 2514, performs a saturating addition with the mask 2512 and the transformed video data 2514, and generates the combined video data 1636 (see FIG. 16). The saturating addition constrains the intensities of the pixels of the combined video data 1636 to the relevant range (e.g., 0 to 255). For example, the saturating addition maybe performed in the color domain, and consists of more than the intensities (which is the grayscale). The transformed video data 2514 may then be in the form (r, g, b) corresponding to red, green and blue values, and the mask 2512 may be in the form (gray_val, gray_val, gray_val) corresponding to intensity values.

FIG. 26 is a block diagram of a corner calculation component 2600. The corner calculation component 2600 may be used to generate the corner information 1522 (see FIG. 15, FIG. 16, etc.). The corner calculation component 2600 may be implemented by the device that implements the other components of the videoconferencing system, such as a laptop or videoconferencing endpoint, for example as controlled by one or more computer programs. The corner calculation component 2600 includes a preprocessing component 2602, a contour identification component 2604, a point calculator component 2606, and an accuracy check component 2608.

The preprocessing component 2602 receives the input video data 1520 (see FIG. 15, FIG. 16, etc.), performs thresholding on the input video data 1520, and generates thresholded video data 2620. In general, the thresholding generates a bitonal (e.g., black and white) image (e.g., a mask), where pixel intensities above the threshold are assigned one value (e.g., 1) and below the threshold are assigned another value (e.g., 0).

The preprocessing component 2602 may implement one or more of a number of processes for the thresholding, where each particular process is applicable to a particular page identification environment. For example, the preprocessing component 2602 may implement one process to identify a white page on a non-white table. As another example, the preprocessing component 2602 may implement another process to identify a white page that has a border. For the page with the border, the user may draw the border, or the page may have been pre-printed with the border. The border may be black, or may be another color that is selected to differ from the other colors in the frame (e.g., yellow highlight, green highlight, orange highlight, blue highlight, etc.).

Alternatively, the preprocessing component 2602 may implement an n-layer approach. In an n-layer approach, the preprocessing component 2602 identifies patterns in the input video data 1520, then combines the identified patterns to generate the thresholded video data 2620.

In general, the n-layer approach implements a cascade of weak heuristic metrics that can be used with a weighing to identify corners.

The preprocessing component 2602 may operate on grayscale image data. Use of grayscale makes the image more independent of the specific camera used (including the CCD geometry since there are more green pixels than red and blue pixels on some CCDs) and the lighting types (e.g., sunlight has a different spectra than an incandescent light bulb).

The contour identification component 2604 receives the thresholded video data 2620, performs contour identification on the thresholded video data 2620, and generates a set of contours 2622. In general, a contour corresponds to the boundary of a collection of points that are connected, and contour identification refers to detecting boundaries between objects or segments. The contour identification component 2604 may implement one or more processes for identifying the contours. One method is to perform border following, for example as described in Satoshi Suzuki et al., "Topological Structural Analysis of Digitized Binary Images by Border Following", in Computer Vision, Graphics, and Image Processing, Volume 30, Issue 1, April 1985, Pages 32-46.

Optionally, the contour identification component 2604 may identify the most likely contour that corresponds to the "page" in the image frame of the thresholded video data 2620. In such a case, the contour identification component 2604 provides that identified contour as the set of contours 2622 to the point calculator component 2606. One method is to select the contour with the largest area, as determined by the number of pixels enclosed in the contour (e.g., as determined according to Green's Theorem for area calculation). Another method is to select the contour with the largest bounding box.

The point calculator component 2606 receives the set of contours 2622, calculates the minimum bounded trapezium (or trapezoid), identifies its corners, and generates corner information 2624 corresponding to the identified corners of the minimum bounded trapezium. In general, the minimum bounded trapezium for a point set in two dimensions (e.g., the set of contours 2622) is the trapezium with the smallest area within which most of the points lie. One method to calculate the minimum bounded trapezium is to determine the minimum bounded box. Two of the points of the bounded box will be on the trapezium. To determine the other two points, the system calculates the line equations between the points of the minimum bounded box that are not on the trapezium, then finds the closest points that are near the line from the minimum bounded box; these two points will be the other two points of the trapezium.

The accuracy check component 2608 receives the corner information 2624, performs an accuracy check on the corner information 2624, and generates the corner information 1522 (see FIG. 15, FIG. 16, etc.). The accuracy check component 2608 generally evaluates whether the corner information 2624 falls within defined maximum values or does not excessively deviate from previous results for the corner information. For example, the accuracy check component 2608 may check the area of the trapezium (e.g., that it is less than the frame size of the video data), whether or not the trapezium is an isosceles trapezium, the perimeter of the trapezium (e.g., that it is less than the frame size), how much the corner information 2624 has changed from the previously-calculated corner information, whether the pixels within the trapezium collectively are more than 50% white, etc.

If the accuracy check component 2608 determines that the corner information 2624 fails the accuracy check, the accuracy check component 2608 may generate the corner information 1522 using previously-calculated values for the corner information (instead of using the presently-calculated corner information 2624 that failed the check).

Optionally, the accuracy check component 2608 may generate an accuracy result 2626 that it provides to the contour identification component 2604 and the point calculator component 2606. The contour identification component 2604 and the point calculator component 2606 then iterate through other contours in the set of contours in a descending order (based upon the bounding box area or contour area) until the accuracy check component 2608 passes the accuracy check calculated on a particular contour; otherwise the accuracy check component 2608 uses the previously-calculated values for the corner information.

An example of the iterative process is as follows. First, the accuracy check component 2608 performs an accuracy check by evaluating whether all (or most) of the points of the contours are on (or near) the four line equations that describe the contours. Second, if the resulting accuracy check has failed, then that contour is discarded and the next contour is selected.

The process then repeats for that next contour (and for subsequent contours as needed) until a suitable contour is found; in the case where no suitable contour is found, the previously-calculated values for the corner information are used.

The accuracy check component 2608 may also receive the contours 2622 and may perform an accuracy check on the contours 2622. In a manner similar to that described above regarding the corner information 2624, the accuracy check component 2608 may perform the accuracy check on the contours 2622 by evaluating whether the contours 2622 fall within defined maximum values or do not excessively deviate from previous results for the contours. If all the accuracy checks pass for the contours 2622, then the accuracy check component 2608 uses the corner information 2624 as the corner information 1522; if not, then the accuracy check component uses the previously-calculated values of the corner information as the corner information 1522.

The corner calculation component 2600 may operate asynchronously with respect to the other components of the videoconferencing system. For example, if the user moves the paper and the corner calculation component 2600 is in the process of determining updated corner information 1522, the other components of the system may use the previously-calculated corner information 1522.

FIG. 27 is a block diagram of a preprocessing component 2700. The preprocessing component 2700 may be used as the preprocessing component 2602 (see FIG. 26). The preprocessing component 2700 may be used to identify a page having a colored border, e.g. drawn on the page using a colored highlighter (yellow, pink, blue, green, etc.). The preprocessing component 2700 includes a conversion component 2702, a thresholding component 2704, and a filter 2706.

The conversion component 2702 receives the input video data 1520 (see FIG. 15, FIG. 16, etc.), converts the input video data 1520 to the hue domain, and generates hue data 2720. For example, the input video 1520 may be RGB (red, green, blue) color data, and the conversion component 2702 may perform conversion into HSL (hue, saturation, lightness) color data or HSV (hue, saturation, value) color data. The conversion component 2702 may operate on a per frame basis, where each frame of the input video data 1520 is converted into a corresponding frame of the hue data 2720.

The thresholding component 2704 receives the hue data 2720, performs thresholding and averaging on the hue data 2720, and generates thresholded data 2722. In general, the averaging serves to filter out noise in the camera feed. The parameters of the thresholding component 2704 may be adjusted according to the highlighted color on the border. For example, to identify a yellow highlighted border, a hue value of between 25 and 35 may be used. The thresholded data 2722 then corresponds to image frames showing the highlighted border.

The filter 2706 receives the thresholded data 2722, performs filtering on the thresholded data 2722, and generates the thresholded video data 2620 (see FIG. 26). The filter 2706 generally operates to remove noise in the thresholded data 2722 (e.g., noise that has been made worse by the thresholding process). The filter 2706 may implement a spatial filter. The filter 2706 may perform erosion and dilation operations as part of the filtering process.

FIG. 28 is a block diagram of a thresholding component 2800. The thresholding component 2800 may be used as the thresholding component 2704 (see FIG. 27). The thresholding component 2800 may operate on a per-frame basis, for example on each frame of the input video data. The thresholding component 2800 includes a thresholding component 2802, an averaging component 2804, and a thresholding component 2806.

The thresholding component 2802 receives the hue data 2720 (see FIG. 27), performs thresholding on the hue data 2720, and generates thresholded data 2820. The thresholding component 2802 generally performs thresholding using a range that corresponds to the designated color of the highlighting (e.g., a hue value of between 25 and 35 for yellow highlighting, etc.).

The averaging component 2804 receives the thresholded data 2820, performs averaging on the thresholded data 2820, and generates averaged data 2822. The averaging component 2804 generally operates to remove noise in the thresholded data 2820 (e.g., that may have been introduced during the thresholding process).

The thresholding component 2806 receives the averaged data 2822, performs thresholding on the averaged data 2822, and generates the thresholded data 2722 (see FIG. 27). In general, the thresholding component 2806 removes parts of the averaged data 2822 that only exist in a few frames (e.g., 1 in 3 frames). The thresholding serves to clean up the noise in camera images in poor lighting conditions.

Figures 29, 30:
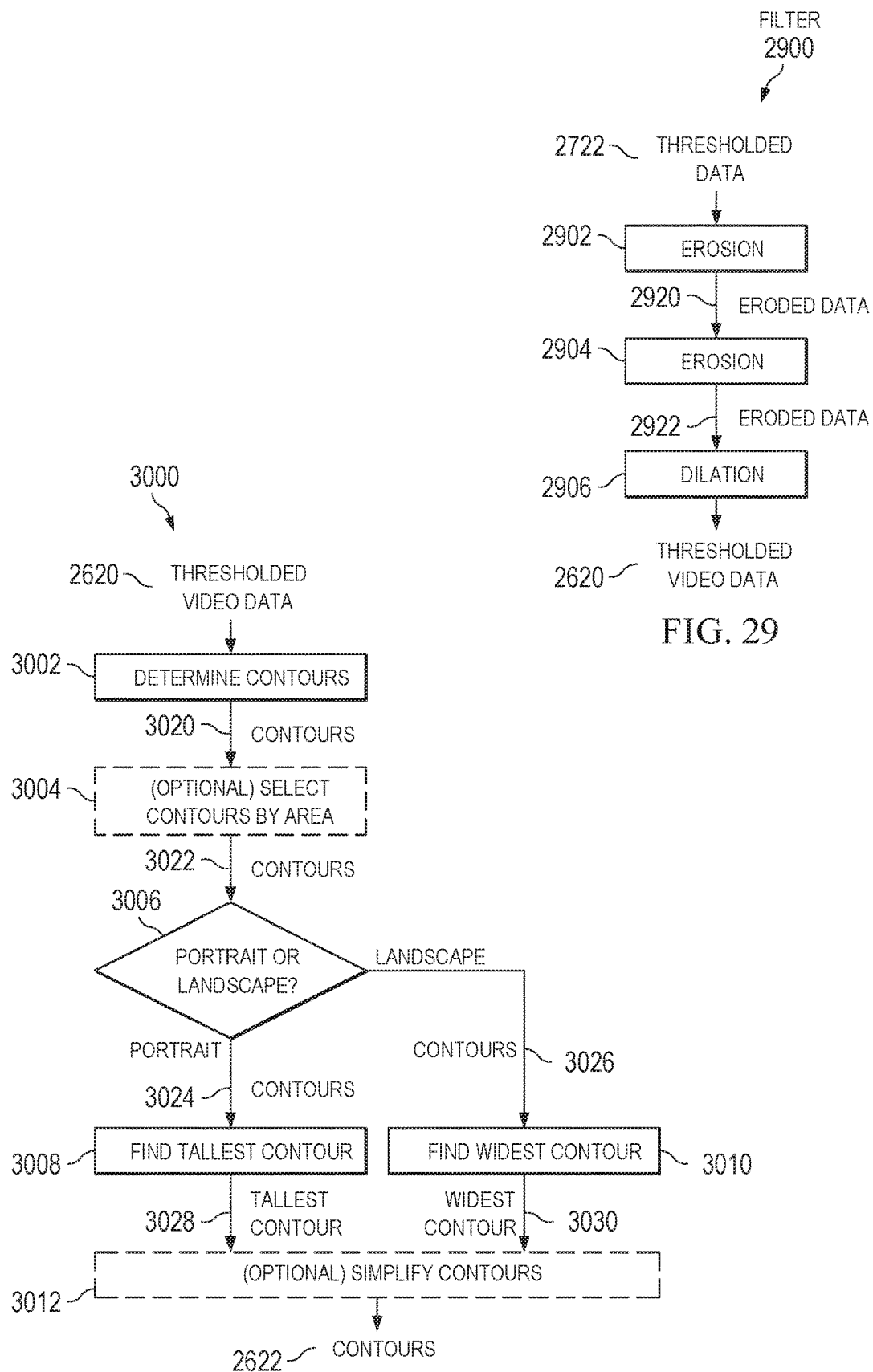
FIG. 29 is a block diagram of a filter 2900.
FIG. 30 is a flow diagram of a method 3000 that may be performed by the contour identification component 2604 (see FIG. 26).

FIG. 29 is a block diagram of a filter 2900. The filter 2900 may be used as the filter 2706 (see FIG. 27). The filter 2900 generally operates as a spatial filter to remove noise from each frame of the image data. The filter 2900 includes an erosion component 2902, an erosion component 2904, and a dilation component 2906.

The erosion component 2902 receives the thresholded data 2722, performs an erosion operation on the thresholded data 2722, and generates eroded data 2920. The erosion component 2902 may perform a 3×3 erosion operation on the thresholded data 2722.

The erosion component 2904 receives the eroded data 2920, performs an erosion operation on the eroded data 2920, and generates eroded data 2922. The erosion component 2904 may perform a 2×2 erosion operation on the eroded data 2920.

Other configurations may be used for the erosion components 2902 and 2904. For example, a single erosion component may implement the erosion, for example using a 5×5 erosion operation.

The dilation component 2906 receives the eroded data 2922, performs a dilation operation on the eroded data 2922, and generates the thresholded video data 2620 (see FIG. 27). The dilation component 2906 may perform a 9×9 dilation operation on the eroded data 2922. By performing an erosion operation followed by a dilation operation, the filter 2900 implements a morphological opening function. In general, the morphological opening function results in removing small objects from an image frame (e.g., noise pixels) while preserving the shape and size of larger objects in the image (e.g., the border).

FIG. 30 is a flow diagram of a method 3000 that may be performed by the contour identification component 2604 (see FIG. 26), for example as controlled according to one or more computer programs.

At 3002, a set of contours 3020 is determined from the thresholded video data 2620 (see FIG. 26). The set of contours 3020 may be determined by processing the thresholded video data 2620 using one or more methods. One method is to calculate gradients of local brightness in the thresholded video data 2620.

At 3004 (optional), a set of contours 3022 having the largest area is selected from the set of contours 3020. The largest area may be determined based on the largest number of pixels within each contour. The number of contours in the set of contours 3022 is generally smaller than that in the set of contours 3020. The number of contours in the set of contours 3022 may be, for example, the three largest contours; this number may be adjusted as desired. This step is optional and may be included as a speed enhancement to reduce the number of contours that are processed in subsequent steps. (This step is a heuristic and a proxy for determining the largest bounding boxes, which is a more computationally expensive calculation.)

At 3006, the set of contours 3022 (or the set of contours 3020, when 3004 is not performed) is analyzed to determine whether the contours are in portrait orientation or in landscape orientation. The set of contours in portrait orientation are the set of contours 3024, and the set of contours in landscape orientation are the set of contours 3026. The method then continues to 3008 (for portrait) or 3010 (for landscape).

At 3008, the tallest contour 3028 is determined from the set of contours 3024.

At 3010, the widest contour 3030 is determined from the set of contours 3026.

At 3012 (optional), the set of contours 3024 (in the portrait case) or the set of contours 3026 (in the landscape case) is simplified to generate the set of contours 2622 (see FIG. 26). Each contour may be simplified by downsampling the number of points within the contour by distance; if two points within a contour are too close to each other, one is discarded. For example, consider that contours are ordered lists of points. The distance from one point to the next is calculated, and the next points are discarded if they are closer than the minimum distance, until a point that is further than the minimum distance away is found. An example downsampling distance is 15 pixels. (Alternatively, the entire image may be downsampled before calculating the contours, and the contours are calculated using the downsampled image.)

The step 3012 is optional in order to reduce the computational complexity of the method 3000, or other methods that use the contours 2622. (When 3012 is not performed, either the tallest contour 3028 or the widest contour 3030 is provided as the set of contours 2622, depending upon the portrait versus landscape determination from 3006.)

As an alternative to 3004, 3006, 3008 and 3010, the set of contours 2622 may be determined from the set of contours 3020 by finding the bounding boxes with the largest areas. The number of bounding boxes found is generally less than the number of the set of contours 3020, and may be adjusted as desired. An example process that finds the bounding boxes with the largest areas is the rotating calipers approach described by G. T. Toussaint, "Solving Geometric Problems with the Rotating Calipers", Proc. MELECON '83, Athens (1983).

Another example process is as described by Freeman and Shapira, "Determining the Minimum-Area Encasing Rectangle for an Arbitrary Closed Curve", Communications of the ACM, Volume 18 Issue 7, July 1975, Pages 409-413.

Figure 31:
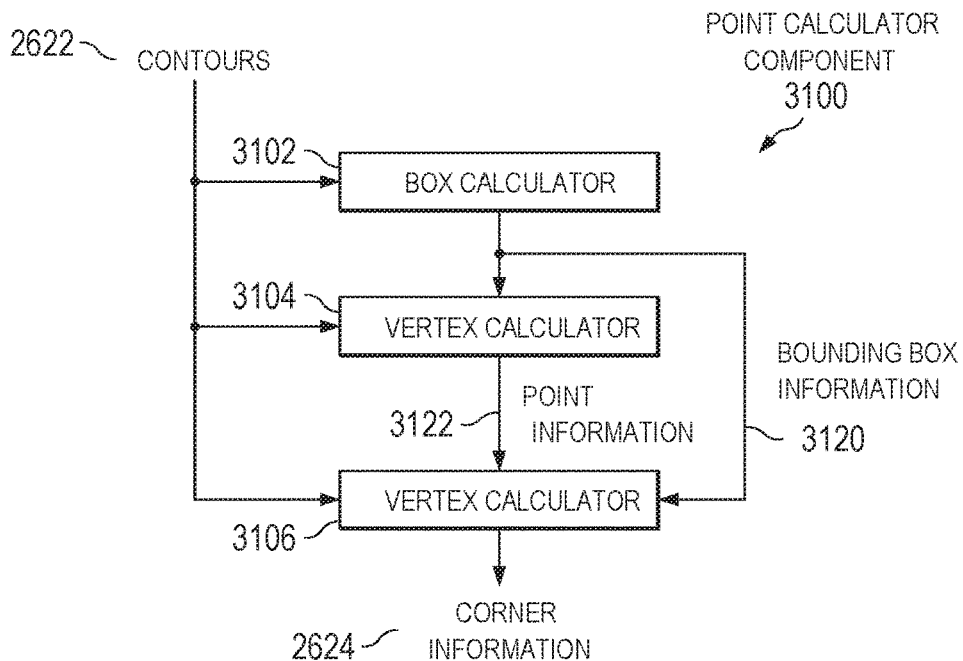
FIG. 31 is a block diagram of a point calculator component 3100.

FIG. 31 is a block diagram of a point calculator component 3100. The point calculator component 3100 may be used to implement the point calculator component 2606 (see FIG. 26). The point calculator component 3100 includes a box calculator component 3102, a vertex calculator component 3104, and a vertex calculator component 3106.

The box calculator component 3102 receives the set of contours 2622 (see FIG. 26), calculates a bounding box for each of the set of contours 2622, and generates bounding box information 3120. The bounding box for a given contour is the box that contains all the points within the given contour. The bounding box information 3120 may correspond to a set of points that defines the bounding box. The set of contours 2622 may be a single contour that is the most likely contour that corresponds to the page, in which case the bounding box information 3120 corresponds to a single bounding box.

The vertex calculator component 3104 receives the set of contours 2622 and the bounding box information 3120, calculates the points on a given contour that intersect with the corresponding bounding box for each of the set of contours 2622, and generates point information 3122. The points on a given contour that intersect with the corresponding bounding box will generally be two points (e.g., adjacent corners), which correspond to two vertices of the minimum bounded trapezium (c.f. the corner information 2624). The point information 3122 then correspond to these points.

The vertex calculator component 3106 receives the set of contours 2622, the bounding box information 3120 and the point information 3122; calculates the other two corners of the trapezium; and generates the corner information 2624. The corner information 2624 then corresponds to the point information 3122 and the other two corners. The vertex calculator component 3106 may calculate the other two corners by drawing a straight line between the two corners of the bounding box that do not have the points of the trapezium on them (e.g., using the bounding box information 3120 and the point information 3122), then identifies the two closest points on the contour that are on (or closest to) that straight line from each point (using the set of contours 2622).

Figure 32:
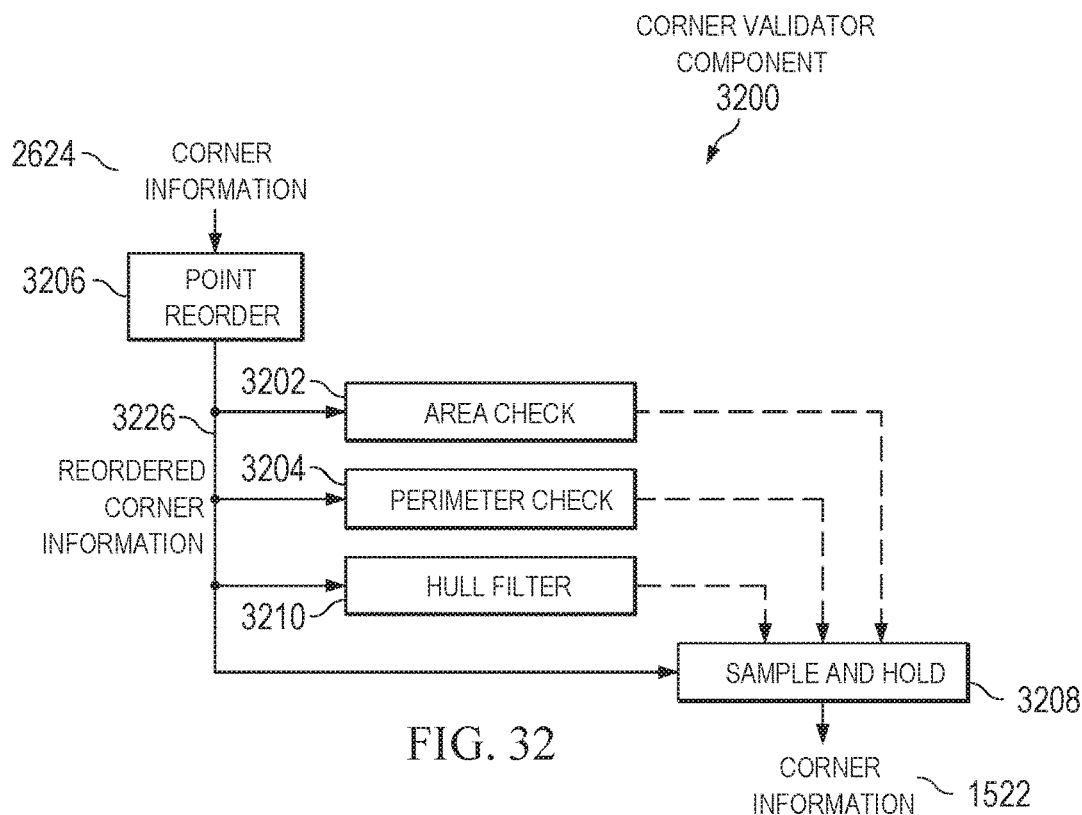
FIG. 32 is a block diagram of a corner validator component 3200.

FIG. 32 is a block diagram of a corner validator component 3200. The corner validator component 3200 may be used to implement the accuracy check component 2608 (see FIG. 26). In general, the corner validator component 3200 implements point filtering to reduce jitter. The corner validator component 3200 may optionally also include accuracy check components that perform various checks to determine whether the proposed bounded trapezium (e.g., according to the corner information 2624) is valid. The corner validator component 3200 includes an area check component 3202 (optional), a perimeter check component 3204 (optional), a point reorder component 3206, a sample and hold component 3208, and a hull filter component 3210 (optional).

The point reorder component 3206 receives the corner information 2624 (see FIG. 26), reorders the points in the corner information 2624 so that they appear in the same order between frames, and generates reordered corner information 3226.

The area check component 3202 (optional) receives the reordered corner information 3226 and checks the area of the trapezium as per the reordered corner information 3226. (The area check component 3202 may also receive the contours 2622 and check the area of the selected contour in a manner similar to that described above regarding the accuracy check component 2608 of FIG. 26.) If the area is valid (e.g., within a defined range corresponding to minimum and maximum expected area values for the paper), the area check component 3202 informs the sample and hold component 3208 of the valid check (pass). If the area is invalid (e.g., outside of the defined range), the area check component 3202 informs the sample and hold component 3208 of the invalid check (fail).

The perimeter check component 3204 (optional) receives the reordered corner information 3226 and checks the perimeter of the trapezium as per the reordered corner information 3226. (The perimeter check component 3204 may also receive the contours 2622 and check the perimeter of the selected contour in a manner similar to that described above regarding the accuracy check component 2608 of FIG. 26.) If the perimeter is valid (e.g., within a defined range corresponding to minimum and maximum expected perimeter values for the paper), the perimeter check component 3204 informs the sample and hold component 3208 of the valid check. If the perimeter is invalid (e.g., outside of the defined range), the perimeter check component 3204 informs the sample and hold component 3208 of the failed check.

The hull filter component 3210 (optional) receives the reordered corner information 3226 and determines whether the area of the hull enclosing the points defined by the reordered corner information 3226 is within a defined range as compared to previous values of the reordered corner information 3226. This hull corresponds to a convex hull of the selected contour (as opposed to the area of the four points used by the area check component 3202). If so, the hull filter component 3210 informs the sample and hold component 3208 of the valid check. If not, the hull filter component 3210 informs the sample and hold component 3208 of the failed check. In general, the hull filter component 3210 ensures that the area of the hull is within a defined size or similar to previously-identified values. The number of previously-identified values that the hull filter component 3210 uses in the comparison may be defined using a expiry period. The expiry period may be adjusted as desired.

The sample and hold component 3208 receives the reordered corner information 3226 and the results of the checks. If all the checks are valid, the sample and hold component 3208 stores the four values of the reordered corner information 3226 and returns those four current values of the reordered corner information 3226 as the corner information 1522. If any of the checks fails, the sample and hold component 3208 returns the four previously-stored values of the reordered corner information 3226 as the corner information 1522.

In general, the sample and hold component 3208 reduces the amount of jitter when displaying the paper. Jitter is distracting to viewers because the geometric transform may change slightly every frame. The points of the corner information 2624 come in from the minimized trapezoid to the point reorder component 3206 as an unordered set of points. The sample and hold component 3208 stops the jitter of the coordinates to ensure they are not constantly changing by measuring the distance between the old and new points. (If they were in a different order between frames, the sample and hold component 3208 would not "filter" the points.) In this context, the term "filter" is only broadly descriptive because the sample and hold component 3208 is just only allowing the points to change based upon a difference threshold.

In addition, the order of the points matters for the geometric transform, because the points need to be in the same order as the frame order. The ordering is determined by the minimum total distance between the frame corners and the page corners where the straight lines intersecting the frame corners and the page corners do not cross the trapezoid.

In summary, the corner validator component 3200 checks that the new points of the corner information 2624 are valid and, if the new points are different enough from the previous points, then return the new points as the corner information 1522. Otherwise, the previous points are returned as the corner information 1522. The new points need to be different from the previous points (within a threshold) to suppress the jitter in the points between frames. The corner validator component 3200 may include additional components that perform additional checks, if so desired. These additional checks may be suitable for certain use cases. One additional check is whether the trapezium is an isosceles trapezium, which is applicable for horizontal pieces of paper. Another additional check is whether the statistics of the image is mostly white (e.g., according to the average pixel intensity) within the bounded trapezium.

As a result of performing the accuracy checks, the corner validator component 3200 implements palm rejection and enables the system to remember where the page is when the view is occluded. For example, when the user's palm is obscuring the page, the area may differ from the previous value (which is detected by the area check component 3202), the perimeter may differ from the previous value (which is detected by the perimeter check component 3204), etc.

A simpler method to implement palm rejection is for the corner validator component to check the number of corners that change. If only one corner changes, then the points are not updated. If multiple corners change, then the points are updated. As a result, if the user's hand is obscuring one corner, the points are not updated.

Another alternative way to implement palm rejection is to remove one side of contours themselves in other components (e.g., the contour identification component 2604 of FIG. 26), so the contours effectively break in two and therefore are ignored due to the area check. Consider that, instead of drawing a box around the page, a "U" shape can be drawn instead. This means that when the bottom part of the "U" is interrupted, the contour itself is broken and instead of being one continuous contour (which would still happen with a rectangle) would break into two contours since the view of the "U" from the camera's perspective would be occluded.

Figure 33:
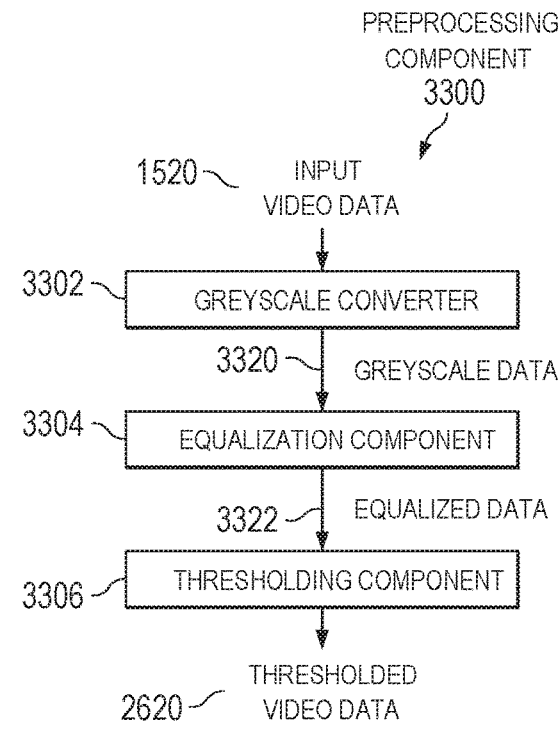
FIG. 33 is a block diagram of a preprocessing component 3300.

FIG. 33 is a block diagram of a preprocessing component 3300. The preprocessing component 3300 may be used as the preprocessing component 2602 (see FIG. 26). As compared to the preprocessing component 2700 (see FIG. 27), the preprocessing component 3300 operates in the grayscale domain. The preprocessing component 3300 includes a grayscale converter 3302, an equalization component 3304, and a thresholding component 3306.

The grayscale converter 3302 receives the input video data 1520 (see FIG. 15, FIG. 16, etc.), converts the input video data 1520 to grayscale, and generates grayscale data 3320. The grayscale data 3320 then corresponds to the input video data in grayscale. The grayscale converter 3302 may implement one or more different conversion processes depending upon the format of the input video data 1520. For example, when the input video data 1520 is in the YUV format (luminance, blue chrominance, red chrominance), the grayscale converter 3302 uses the Y component directly as the grayscale component.

The equalization component 3304 receives the grayscale data 3320, performs equalization on the grayscale data 3320, and generates equalized data 3322. The equalized data 3322 then corresponds to the input video data, in grayscale and equalized. The equalization component 3304 may perform adaptive histogram equalization. In general, adaptive histogram equalization improves the contrast in image data, which enables the system to be more lighting independent in order to use a fixed threshold without the need for tuning. Adaptive histogram equalization differs from ordinary histogram equalization in the respect that the adaptive method computes several histograms, each corresponding to a distinct section of the image, and uses them to redistribute the lightness values of the image. It is therefore suitable for improving the local contrast and enhancing the definitions of edges in each region of an image. Adaptive histogram equalization also works together with the white balancing algorithm implemented by the camera.

The equalization component 3304 may perform contrast limited adaptive histogram equalization. In general, contrast limited adaptive histogram equalization limits the contrast amplification in near-constant regions of the image, since the histogram in such regions is highly concentrated. As a result, adaptive histogram equalization (without the contrast limiting) may result in noise amplification in relatively homogeneous regions of the image; this is overcome by the contrast limiting.

The parameters used for adaptive histogram equalization or contrast limited adaptive histogram equalization may be adjusted according to the resolution. A 5×5 grid may be used for either equalization.

The thresholding component 3306 receives the equalized data 3322, performs thresholding on the equalized data 3322, and generates the thresholded video data 2620 (see FIG. 26). The thresholding component 3306 may perform thresholding according to a threshold value. For example, for 256 intensity values (0-255) using a threshold of 50%, the threshold value is 127; intensity values 127 or less are thresholded to 0, and intensity values greater than 127 are thresholded to 1. The threshold value may be adjusted as desired.

Figure 34:
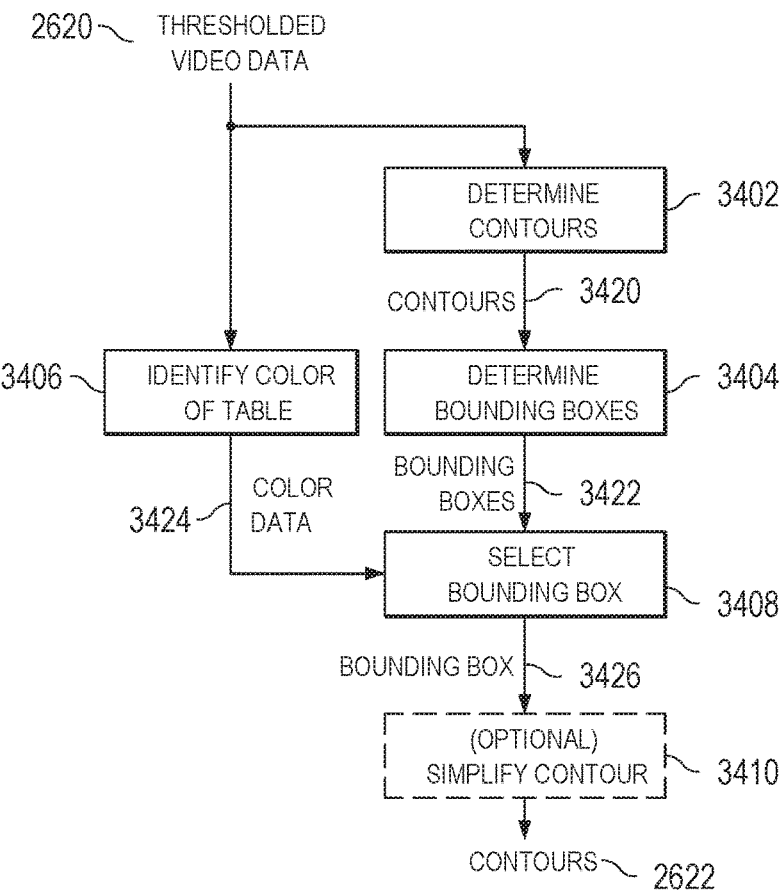
FIG. 34 is a flow diagram of a method 3400 that may be performed by the contour identification component 2604 (see FIG. 26).

FIG. 34 is a flow diagram of a method 3400 that may be performed by the contour identification component 2604 (see FIG. 26), for example as controlled according to one or more computer programs. As compared to the method 3000 (see FIG. 30), the method 3400 takes into account the color of the table, and determines whether the system has captured a page with a black border or just a page without a border.

At 3402, a set of contours 3420 is determined from the thresholded video data 2620 (see FIG. 26). The set of contours 3420 may be determined by processing the thresholded video data 2620 using one or more methods. One method is to calculate gradients of local brightness in the thresholded video data 2620. (The step 3402 may be similar to the step 3002 of FIG. 30.) At 3404, a set of bounding boxes 3422 is determined from the set of contours 3420. Each bounding box in the set of bounding boxes 3422 is associated with a corresponding one of the set of contours 3420. The set of bounding boxes 3422 may be determined by processing the set of contours 3420 using one or more methods (e.g., as described above regarding the coordinate generator 1306 of FIG. 13).

At 3406, the color of the table is identified from the thresholded video data 2620, resulting in table color data 3424. For example, a "white" table may be identified when the quantity of pixels of the thresholded frame are above a threshold, otherwise the table is identified as "dark"; the threshold may be 65% white. Since the thresholded video data 2620 is bitonal, the table color data 3424 indicates whether the table is light (e.g., similar in color to the page) or dark (e.g., significantly different in color from the page).

At 3408, a bounding box 3426 of the set of bounding boxes 3422 is selected using the table color data 3424. When the table color data 3424 indicates a dark table, the selected bounding box 3426 is the largest bounding box of the set of bounding boxes 3422 (since the white page will show up as the largest). When the table color data 3424 indicates a light table, the selected bounding box 3426 is the second-largest bounding box of the set of bounding boxes 3422 (since the light table itself will show up as the largest). The largest bounding box may be identified by its area (e.g., the base times height of the bounding box).

At 3410 (optional), the contour of the bounding box 3426 is simplified to generate the set of contours 2622 (see FIG. 26), in this case a single contour. The contour may be simplified by downsampling the number of points within the contour by distance. For example, if two points within a contour are too close to each other, one is discarded (e.g., in a manner similar to that described above regarding 3012 in FIG. 30). The step 3410 is optional in order to reduce the computational complexity of the method 3400.

(When 3410 is not performed, the bounding box 3426 is provided as the set of contours 2622.)

Figure 35:
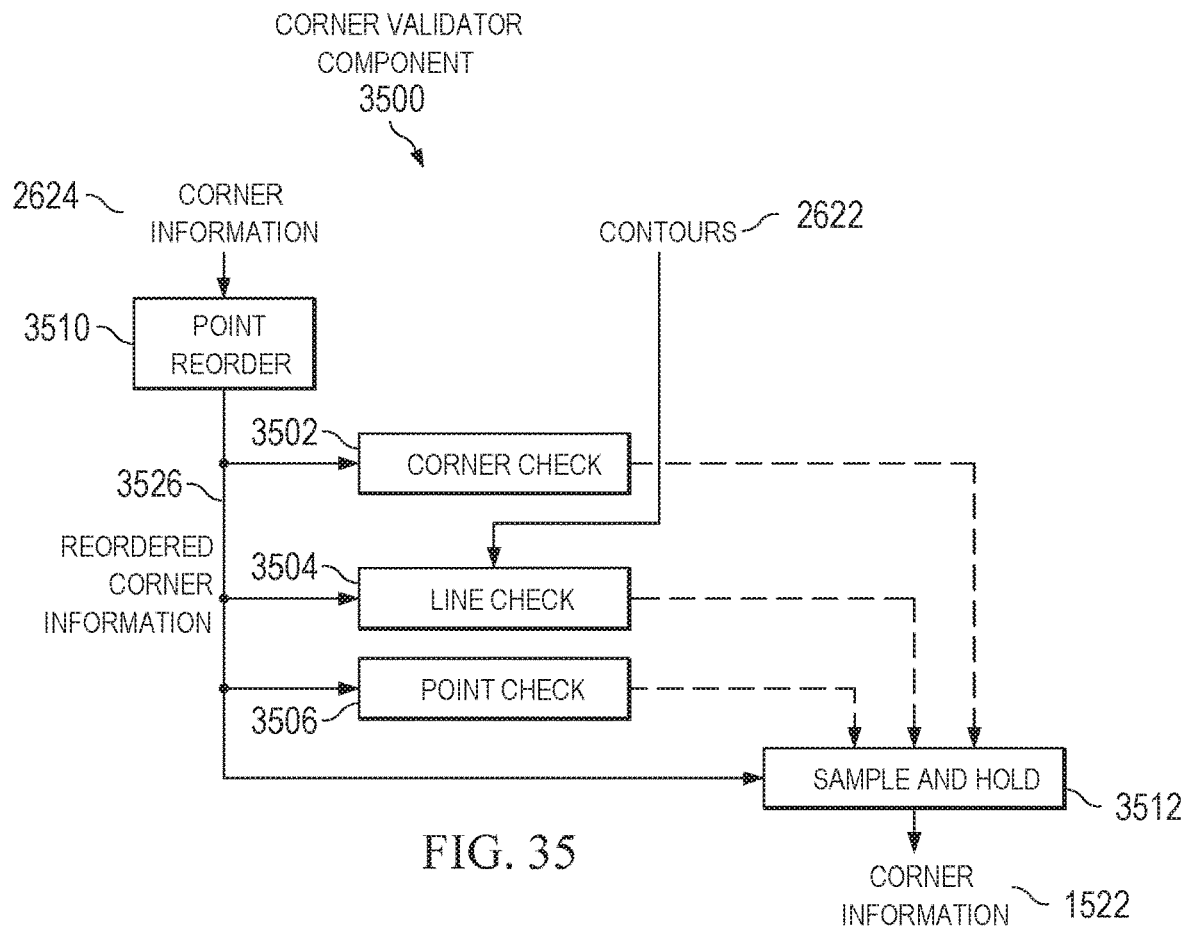
FIG. 35 is a block diagram of a corner validator component 3500.

FIG. 35 is a block diagram of a corner validator component 3500. The corner validator component 3500 may be used to implement the accuracy check component 2608 (see FIG. 26). As with the corner validator component 3200 (see FIG. 32), the corner validator component 3500 may perform various checks to determine whether the proposed bounded quadrilateral (e.g., according to the corner information 2624) is valid. The corner validator component 3500 includes a corner check component 3502 (optional), a line check component 3504, a point check component 3506, a point reorder component 3510, and a sample and hold component 3512.

The point reorder component 3510 receives the corner information 2624 (see FIG. 26), reorders the points in the corner information 2624 so that they appear in the same order between frames, and generates reordered corner information 3526. The point reorder component 3510 may otherwise be similar to the point reorder component 3206 (see FIG. 32).

The corner check component 3502 (optional) receives the reordered corner information 3526 and checks whether the four corners are far enough distance apart, according to a fixed threshold value. The threshold value may be set according to the configuration of the other components of the system, and may be adjusted as desired. If the distance is far enough, the corner check component 3502 informs the sample and hold component 3512 of the valid check (pass). If the distance is not far enough, the corner check component 3502 informs the sample and hold component 3512 of the invalid check (fail).

The line check component 3504 receives the reordered corner information 3526 and the set of contours 2622 (see FIG. 26), and checks whether the chosen contour's set of points (e.g., as per the set of contours 2622) lie within a defined threshold distance of any of the four lines of the bounded trapezium (e.g., according to the reordered corner information 3526). For example, the line check component 3504 may calculate the line equations for the four lines of the bounded trapezium, may calculate the distance between each point on the contour and the line equations, and then may compare the calculated distance with the threshold distance.

The threshold distance may be adjusted as desired. If the points are within the threshold distance, the line check component 3504 informs the sample and hold component 3512 of the valid check (pass). If the points are not within the defined distance, the line check component 3504 informs the sample and hold component 3512 of the invalid check (fail). In this manner, the line check component 3504 evaluates whether the contour is not a regular quadrilateral but some other non-regular shape of many sides.

The point check component 3506 receives the reordered corner information 3526 and checks whether all the points of the reordered corner information 3526 are within a defined distance of the points of the previous corner information. For example, the defined distance may be 40 pixels for a 1920×1080 frame; this may be adjusted as desired e.g. for different frame sizes. If the current points are not within the defined distance, the point check component 3506 informs the sample and hold component 3512 of the valid check (pass). If the current points are within the defined distance of the previous points, the point check component 3506 informs the sample and hold component 3512 of the invalid check (fail). In this manner, the point check component 3506 determines whether at least two points have changed. The defined distance is used to detect that the points have changed more than a certain amount to stop the geometric transform from jittering and moving when the page has not moved. By determining whether at least two points have changed, the point check component 3506 ignores the case where a hand has occluded one corner of the page.

The sample and hold component 3512 receives the reordered corner information 3526 and the results of the checks. If all the checks are valid, the sample and hold component 3512 stores the four values of the reordered corner information 3526 and returns those four current values of the reordered corner information 3526 as the corner information 1522. If any of the checks fails, the sample and hold component 3512 returns the four previously-stored values of the reordered corner information 3526 as the corner information 1522. The sample and hold component 3512 may otherwise be similar to the sample and hold component 3208 (see FIG. 32).

The corner validator component 3500 may include additional components that perform additional checks, if so desired. These additional checks may be suitable for certain use cases. One additional check is whether the trapezium is an isosceles trapezium, which is applicable for horizontal pieces of paper. Another additional check is whether the statistics of the image is mostly white (e.g., according to the average pixel intensity) within the bounded trapezium.

As with the corner validator component 3200 (see FIG. 32), the corner validator component 3500 implements palm rejection and enables the system to remember where the page is when the view is occluded.

Figure 36:
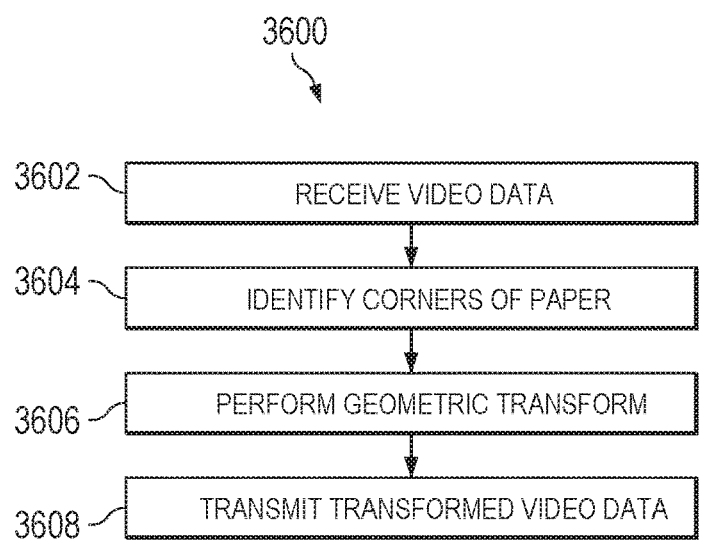
FIG. 36 is a flow diagram of a method 3600 of sharing a writing surface captured on video.

FIG. 36 is a flow diagram of a method 3600 of sharing a writing surface captured on video. The writing surface may be a piece of paper. The method 3600 may be performed by a videoconferencing system, such as the videoconferencing system 100 (see FIG. 1), the videoconferencing system 200 (see FIG. 2), etc. For example, the videoconferencing endpoint 102 (see FIG. 1) or the videoconferencing endpoint 202 (see FIG. 2) may implement a computer program that controls the endpoint to perform the method 3600. As another example, the videoconferencing endpoint 102 may implement the system 1500 (see FIG. 15) that performs the method 3600.

At 3602, video data is received. The video data captures a physical writing surface and a region outside of the physical writing surface. For example, a laptop computer implementing a videoconferencing endpoint may include the video camera 230 (see FIG. 2) that captures the input video data 1520; the input video data 1520 captures a piece of paper on a desk surface (see FIG. 21A).

At 3604, a plurality of corners of the physical writing surface are identified in the video data. For example, the videoconferencing endpoint 102 (see FIG. 1) may implement the corner calculation component 2600 (see FIG. 26) that generates the corner information 1522 (see FIG. 15, FIG. 16, etc.) by processing the image data of the captured paper.

At 3606, a geometric transform is performed on the video data using the plurality of corners to generate second video data that corresponds to the physical writing surface excluding the region outside of the physical writing surface. For example, the videoconferencing endpoint 102 (see FIG. 1) may implement the geometric transform component 1504 (see FIG. 15, FIG. 16, etc.) that performs a geometric transform on the transformed video data 1524 using the corner information 1522 to generate the transformed video data 1526. The transformed video data 1526 then corresponds to the page (flipped, de-skewed and zoomed, as shown in FIG. 21D). As an option, an enhancement process (e.g., using the mask creation component 1630 of FIG. 16) may be performed prior to the geometric transform, e.g. to improve the contrast of the captured writing on the page.

At 3608, the transformed video data is transmitted. For example, the videoconferencing system 100 (see FIG. 1) or the videoconferencing system 200 (see FIG. 2) may transmit the transformed video data 1526 (see FIG. 15, FIG. 16, etc.) as part of a videoconference. The transformed video data may then be received and displayed by other devices participating in the videoconference. As a result, the other devices may display video data corresponding to the page (flipped, de-skewed and zoomed), as compared to displaying a headshot of the other videoconferencing user.

Interactions Between Whiteboard Snapshotting, Gesture Enrollment and Sharing a Writing Surface All three of the features described herein may be generally categorized as enrollment features. Gesture enrollment provides improvements related to initiating the enrollment process. For example, using gesture enrollment to enroll a specific area of the whiteboard may improve the user experience as compared to other existing enrollment methods. Sharing a writing surface provides improvements related to expanding the objects that may be enrolled. For example, the features related to sharing a writing surface enable the user to enroll a normal piece of paper for use during the videoconference, instead of being limited to using a whiteboard. As another example, gesture enrollment may be combined with sharing a writing surface in order to enroll (using gestures) a particular area of the identified piece of paper.

Whiteboard snapshotting provides improvements related to actions performed after enrollment. For example, once a particular area of the whiteboard has been enrolled using gesture enrollment, or once a piece of paper has been enrolled, snapshotting may be performed on that particular area or on the enrolled piece of paper. In particular, it is often useful for the system to take a snapshot at the conclusion of the enrollment process (e.g., to document the writing in the new enrollment area).

Implementation Details

An embodiment may be implemented in hardware, executable modules stored on a computer readable medium, or a combination of both (e.g., programmable logic arrays). Unless otherwise specified, the steps executed by embodiments need not inherently be related to any particular computer or other apparatus, although they may be in certain embodiments. In particular, various general-purpose machines may be used with programs written in accordance with the teachings herein, or it may be more convenient to construct more specialized apparatus (e.g., integrated circuits) to perform the required method steps. Thus, embodiments may be implemented in one or more computer programs executing on one or more programmable computer systems each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein. (Software per se and intangible or transitory signals are excluded to the extent that they are unpatentable subject matter.)

In an example, a computer, such as a laptop, equipped with a webcam is configured as a videoconferencing endpoint, e.g. the computer is configured to run videoconferencing software for communicating with at least one of a remote videoconferencing client and a remote videoconferencing sever. The computer is further configured to perform any of the methods of the present disclosure for generating snapshots, and to communicate the resulting snapshots to other devices.

Various features and aspects will be appreciated from the following enumerated example embodiments ("EEEs"):

EEE 21. A method of enrolling a writing surface captured on video, the method comprising:
receiving video data, wherein the video data captures a physical writing surface;
identifying an enrollment gesture by a user in the video data, wherein the enrollment gesture is associated with an area of the physical writing surface;
determining, in the video data, a set of coordinates corresponding to the enrollment gesture, wherein the set of coordinates is associated with the area of the physical writing surface identified by the enrollment gesture; and
performing a geometric transform on the video data using the set of coordinates to generate transformed video data that corresponds to the area identified by the enrollment gesture.

EEE 22. The method of EEE 21, wherein identifying the enrollment gesture comprises:
processing the video data using a machine learning model trained using a plurality of gestures.

EEE 23. The method of EEE 22, wherein the machine learning model includes at least one of an adaptive boosting machine learning model, a Haar-like feature classifier, a convolutional neural network, a deep learning network, and a recurrent neural network.

EEE 24. The method of any one of EEEs 21-23, wherein determining the set of coordinates comprises:
determining a first coordinate corresponding to a first location of the enrollment gesture and a second coordinate corresponding to a second location of the enrollment gesture;
determining at least one line in the video data, wherein the at least one line includes one or more of a horizontal line and a vertical line;
determining a third coordinate corresponding to a third location according to the first coordinate, the second coordinate and the at least one line; and
determining a fourth coordinate corresponding to a fourth location according to the first coordinate, the second coordinate and the at least one line.

EEE 25. The method of any one of EEEs 21-24, wherein performing the geometric transform to generate the transformed video data comprises:
performing an affine transform on the video data using the set of coordinates to generate the transformed video data.

EEE 26. The method of any one of EEEs 21-25, further comprising:
transmitting the transformed video data.

EEE 27. The method of any one of EEEs 21-26, further comprising:
identifying a second enrollment gesture, wherein the second enrollment gesture is associated with a second area of the physical writing surface;
determining a second set of coordinates corresponding to the second enrollment gesture, wherein the second set of coordinates differs from the set of coordinates; and
performing the geometric transform on the video data using the second set of coordinates, instead of the first set of coordinates, to generate second transformed video data that corresponds to the second area identified by the second enrollment gesture.

EEE 28. A non-transitory computer readable medium storing a computer program that, when executed by a processor, controls an apparatus to execute processing including the method of any one of EEEs 21-27.

EEE 29. An apparatus for enrolling a writing surface captured on video, the apparatus comprising:
 a processor; and
 a memory,
 wherein the processor is configured to control the apparatus to receive video data, wherein the video data captures a physical writing surface;
 wherein the processor is configured to control the apparatus to identify an enrollment gesture by a user in the video data, wherein the enrollment gesture is associated with an area of the physical writing surface;
 wherein the processor is configured to control the apparatus to determine, in the video data, a set of coordinates corresponding to the enrollment gesture, wherein the set of coordinates is associated with the area of the physical writing surface identified by the enrollment gesture; and
 wherein the processor is configured to control the apparatus to perform a geometric transform on the video data using the set of coordinates to generate transformed video data that corresponds to the area identified by the enrollment gesture.

EEE 30. The apparatus of EEE 29, wherein identifying the enrollment gesture comprises:
 processing the video data using a machine learning model trained using a plurality of gestures.

EEE 31. The apparatus of EEE 30, wherein the machine learning model includes at least one of an adaptive boosting machine learning model, a Haar-like feature classifier, a convolutional neural network, a deep learning network, and a recurrent neural network.

EEE 32. The apparatus of any one of EEEs 29-31, wherein determining the set of coordinates comprises:
 determining a first coordinate corresponding to a first location of the enrollment gesture and a second coordinate corresponding to a second location of the enrollment gesture;
 determining at least one line in the video data, wherein the at least one line includes one or more of a horizontal line and a vertical line;
 determining a third coordinate corresponding to a third location according to the first coordinate, the second coordinate and the at least one line; and
 determining a fourth coordinate corresponding to a fourth location according to the first coordinate, the second coordinate and the at least one line.

EEE 33. The apparatus of any one of EEEs 29-32, wherein performing the geometric transform to generate the transformed video data comprises:
 performing an affine transform on the video data using the set of coordinates to generate the transformed video data.

EEE 34. The apparatus of any one of EEEs 29-33, wherein the processor is configured to control the apparatus to transmit the transformed video data.

EEE 35. The apparatus of any one of EEEs 29-34, wherein the processor is configured to control the apparatus to identify a second enrollment gesture, wherein the second enrollment gesture is associated with a second area of the physical writing surface;
 wherein the processor is configured to control the apparatus to determine a second set of coordinates corresponding to the second enrollment gesture, wherein the second set of coordinates differs from the set of coordinates; and
 wherein the processor is configured to control the apparatus to perform the geometric transform on the video data using the second set of coordinates, instead of the first set of coordinates, to generate second transformed video data that corresponds to the second area identified by the second enrollment gesture.

EEE 36. A method of sharing a writing surface captured on video, the method comprising:
 receiving video data, wherein the video data captures a physical writing surface and a region outside of the physical writing surface;
 identifying, in the video data, a plurality of corners of the physical writing surface; and
 performing a geometric transform on the video data using the plurality of corners to generate second video data that corresponds to the physical writing surface excluding the region outside of the physical writing surface.

EEE 37. The method of EEE 36, further comprising:
 generating a mask by applying an adaptive threshold to the video data; and
 combining the video data and the mask to generate combined video data,
 wherein performing the geometric transform comprises performing the geometric transform on the combined video data using the plurality of corners to generate the second video data that corresponds to the physical writing surface excluding the region outside of the physical writing surface.

EEE 38. The method of any one of EEEs 36-37, further comprising:
 receiving first video data, wherein the first video data captures the physical writing surface and the region outside of the physical writing surface using a wide angle lens;
 performing a first transform on the first video data to generate first transformed video data, wherein the first transform corrects for a distortion of the wide angle lens; and
 upscaling the first transformed video data using the plurality of corners to generate the video data.

EEE 39. The method of any one of EEEs 36-38, wherein performing the geometric transform comprises:
 performing a perspective transform on the combined video data using the plurality of corners to generate second video data.

EEE 40. The method of any one of EEEs 36-38, wherein performing the geometric transform comprises:
 performing an affine transform on the combined video data using the plurality of corners to generate second video data.

EEE 41. The method of any one of EEEs 36-40, further comprising:
 generating a bounding box in the combined video data using the plurality of corners.

EEE 42. The method of any one of EEEs 36-41, wherein identifying the plurality of corners includes:
 identifying a plurality of contours in the combined video data;
 determining a bounded quadrilateral using the plurality of contours, wherein the bounded quadrilateral corresponds to the physical writing surface; and
 identifying the plurality of corners of the bounded quadrilateral.

EEE 43. A non-transitory computer readable medium storing a computer program that, when executed by a processor, controls an apparatus to execute processing including the method of any one of EEEs 36-42.

EEE 44. An apparatus for sharing a writing surface captured on video, the apparatus comprising:
  a processor; and
  a memory,
  wherein the processor is configured to control the apparatus to receive video data, wherein the video data captures a physical writing surface and a region outside of the physical writing surface;
  wherein the processor is configured to control the apparatus to identify, in the video data, a plurality of corners of the physical writing surface; and
  wherein the processor is configured to control the apparatus to perform a geometric transform on the video data using the plurality of corners to generate second video data that corresponds to the physical writing surface excluding the region outside of the physical writing surface.

EEE 45. The apparatus of EEE 44, wherein the processor is configured to control the apparatus to generate a mask by applying an adaptive threshold to the video data;
  wherein the processor is configured to control the apparatus to combine the video data and the mask to generate combined video data; and
  wherein performing the geometric transform comprises performing the geometric transform on the combined video data using the plurality of corners to generate the second video data that corresponds to the physical writing surface excluding the region outside of the physical writing surface.

EEE 46. The apparatus of any one of EEEs 44-45, wherein the processor is configured to control the apparatus to receive first video data, wherein the first video data captures the physical writing surface and the region outside of the physical writing surface using a wide angle lens;
  wherein the processor is configured to control the apparatus to perform a first transform on the first video data to generate first transformed video data, wherein the first transform corrects for a distortion of the wide angle lens; and
  wherein the processor is configured to control the apparatus to upscale the first transformed video data using the plurality of corners to generate the video data.

EEE 47. The apparatus of any one of EEEs 44-46, wherein performing the geometric transform comprises:
  performing a perspective transform on the combined video data using the plurality of corners to generate second video data.

EEE 48. The apparatus of any one of EEEs 44-46, wherein performing the geometric transform comprises:
  performing an affine transform on the combined video data using the plurality of corners to generate second video data.

EEE 49. The apparatus of any one of EEEs 44-48, wherein the processor is configured to control the apparatus to generate a bounding box in the combined video data using the plurality of corners.

EEE 50. The apparatus of any one of EEEs 44-49, wherein identifying the plurality of corners includes:
  identifying a plurality of contours in the combined video data;
  determining a bounded quadrilateral using the plurality of contours, wherein the bounded quadrilateral corresponds to the physical writing surface; and
  identifying the plurality of corners of the bounded quadrilateral.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

REFERENCES

International Application Pub. No. WO2019067704A1.
U.S. Application Pub. No. 2015/0127340.
U.S. Application Pub. No. 2018/0279063.
U.S. Pat. No. 8,914,452.
U.S. Pat. No. 9,300,912.
U.S. Pat. No. 9,762,855.
U.S. Application Pub. No. 2012/0016960.
U.S. Application Pub. No. 2015/0169069.
U.S. Application Pub. No. 2017/0115855.
U.S. Application Pub. No. 2015/0009278.
U.S. Application Pub. No. 2015/0067536.
U.S. Application Pub. No. 2011/0197147.
U.S. Application Pub. No. 2005/0104901.
U.S. Application Pub. No. 2002/0180726.
U.S. Application Pub. No. 2004/0165786.
U.S. Application Pub. No. 2007/0156816.
U.S. Application Pub. No. 2012/0001999.
U.S. Application Pub. No. 2018/0232192.
Satoshi Suzuki et al., "Topological Structural Analysis of Digitized Binary Images by Border Following", in Computer Vision, Graphics, and Image Processing, Volume 30, Issue 1, April 1985, Pages 32-46.
G. T. Toussaint, "Solving Geometric Problems with the Rotating Calipers", Proc. MELECON '83, Athens (1983).
Freeman and Shapira, "Determining the Minimum-Area Encasing Rectangle for an Arbitrary Closed Curve", Communications of the ACM, Volume 18 Issue 7, July 1975, Pages 409-413.

What is claimed is:

1. A method of generating a record of content appearing on a physical surface and captured on video, the method comprising:
  generating, by a video camera, video data that includes image data of the physical surface;
  identifying, in an identifier component, by applying a difference measure to the video data, at least one period of interest in the video data by receiving an uncompressed video stream representing the video data and performing encoding on the uncompressed video stream to generate a compressed video stream in an encoder component, transmitting the compressed video stream from the encoder component to a decoder component, and performing decoding of the compressed video stream in the decoder component to generate decompressed video data, wherein the encoder component is placed in a transmitting endpoint and the decoder component placed in a receiving endpoint, wherein the decompressed video data includes a plurality of intra-frames;
  for each period of interest of the at least one period of interest, selecting, in an image selector component, a still image of the image data of the physical surface;
  wherein the still image is selected from the plurality of intra-frames of the period of interest; and
  generating a set of images that includes each still image for the at least one period of interest in the video data, wherein the set of images provides snapshots of the content appearing on the physical surface.

2. The method of claim 1, wherein the at least one period of interest is identified in the video data contemporaneously with transmitting the video data.

3. The method of claim 1, wherein the at least one period of interest is identified in the video data after an end of transmitting the video data.

4. The method of claim 1, wherein the transmitting endpoint identifies the at least one period of interest and selects the still image.

5. The method of claim 1, wherein the receiving endpoint identifies the at least one period of interest and selects the still image.

6. The method of claim 1, wherein an endpoint generates the video data, and wherein a server identifies the at least one period of interest and selects the still image.

7. The method of claim 1, further comprising:
transmitting an electronic message that includes the still image.

8. The method of claim 1, wherein the difference measure corresponds to a difference between a first filtering operation and a second filtering operation applied to the video data.

9. The method of claim 1, wherein the difference measure corresponds to a rate of the video data exceeding a threshold.

10. The method of claim 1, further comprising:
adjusting a rate at which the plurality of intra-frames is generated, wherein the rate is adjusted from a first rate to a second rate, wherein the first rate corresponds to meeting a bandwidth constraint for transmitting the video data using a first number of the plurality of intra-frames, and wherein the second rate corresponds to transmitting the video data using a second number of the plurality of intra-frames, wherein the second number is greater than the first number.

11. The method of claim 1, further comprising:
receiving feedback regarding the set of images; and
adjusting the difference measure in response to the feedback.

12. The method of claim 1, further comprising:
generating, by a microphone, audio data related to the video data;
performing audio to text processing on the audio data to generate textual data; and
associating a portion of the textual data with each still image,
wherein the set of images includes the textual data associated with each still image.

13. The method of claim 1, further comprising:
generating, by a microphone, audio data related to the video data;
generating textual data by performing a probabilistic combination of speech processing of the audio data and character recognition processing of the video data; and
associating a portion of the textual data with each still image,
wherein the set of images includes the textual data associated with each still image.

14. The method of claim 1, wherein selecting the still image is performed according to a two-state Hidden Markov Model applied to the video data.

15. A non-transitory computer readable medium storing a computer program that, when executed by a processor, controls an apparatus to execute processing including the method of claim 1.

16. A system for generating a record of content appearing on a physical surface and captured on video, the apparatus comprising:
a transmitting endpoint;
a receiving endpoint;
wherein the transmitting endpoint comprises a video camera configured to generate video data, wherein the video data includes image data of the physical surface; and an encoder component configured to generate a compressed video stream from an uncompressed video stream representing the video data;
wherein the receiving endpoint comprises a decoder component configured to generate decompressed video data, wherein the decompressed video data includes a plurality of intra-frames, an identifier component executed by a processor configured to control the system to identify, by applying a difference measure to the video data, at least one period of interest in the video data, and an image selector component executed by the processor configured to control the system to select, for each period of interest of the at least one period of interest, a still image of the image data of the physical surface, wherein the still image is selected from the plurality of intra-frames of the period of interest, wherein the intra-frames correspond to still images;
wherein the processor is configured to control the system to generate a set of images that includes each still image for the at least one period of interest in the video data, wherein the set of images provides snapshots of the content appearing on the physical surface.

17. The system of claim 16, wherein:
the transmitting endpoint is configured to transmit an electronic message that includes the still image.

* * * * *